(12) United States Patent
Relyea et al.

(10) Patent No.: US 9,191,431 B2
(45) Date of Patent: Nov. 17, 2015

(54) SYSTEMS AND METHODS FOR SHARING MEDIA CONTENT BETWEEN USERS

(75) Inventors: Donald H. Relyea, Dallas, TX (US); Enrique Ruiz-Velasco, Flower Mound, TX (US); Siddharth Pandey, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 369 days.

(21) Appl. No.: 13/176,730

(22) Filed: Jul. 5, 2011

(65) Prior Publication Data

US 2013/0013698 A1 Jan. 10, 2013

(51) Int. Cl.
*G06F 15/16* (2006.01)
*H04L 29/08* (2006.01)
*H04L 12/18* (2006.01)
*H04L 29/06* (2006.01)

(52) U.S. Cl.
CPC ............ *H04L 67/06* (2013.01); *H04L 12/1818* (2013.01); *H04L 65/4015* (2013.01); *H04L 67/26* (2013.01)

(58) Field of Classification Search
USPC ......................................................... 709/206
See application file for complete search history.

(56) References Cited

U.S. PATENT DOCUMENTS

| 7,686,693 | B2 * | 3/2010 | Danieli et al. ................... 463/42 |
| 8,862,762 | B1 * | 10/2014 | Motrenko et al. ............. 709/231 |
| 2006/0156351 | A1 * | 7/2006 | Gentric et al. ................... 725/86 |
| 2008/0127289 | A1 * | 5/2008 | Julia et al. ...................... 725/109 |
| 2008/0235745 | A1 * | 9/2008 | Edwards et al. ............... 725/110 |
| 2009/0260060 | A1 * | 10/2009 | Smith et al. ........................ 726/3 |
| 2009/0265245 | A1 * | 10/2009 | Wright ........................ 705/14.66 |
| 2009/0279455 | A1 * | 11/2009 | Wang et al. ..................... 370/260 |
| 2011/0090334 | A1 * | 4/2011 | Hicks et al. .................... 348/143 |
| 2011/0131600 | A1 * | 6/2011 | Howcroft et al. ............... 725/28 |
| 2011/0285863 | A1 * | 11/2011 | Burke et al. ................ 348/207.1 |
| 2012/0131609 | A1 * | 5/2012 | Fernandez Gutierrez et al. ............................... 725/34 |
| 2012/0197735 | A1 * | 8/2012 | Dey ........................... 705/14.66 |
| 2012/0303710 | A1 * | 11/2012 | Roberts et al. ................. 709/204 |
| 2012/0303834 | A1 * | 11/2012 | Adam et al. ................... 709/231 |

OTHER PUBLICATIONS

NEXT2FRIENDS, Live Streaming Video, 2 pages, http://next2friends.com/, as accessed on May 24, 2011.
QIK, Live Video Streaming, 4 pages, http://qik.com/, as accessed on May 24, 2011.

(Continued)

*Primary Examiner* — Viet Vu
*Assistant Examiner* — James Edwards

(57) ABSTRACT

An exemplary system includes a first user device associated with a first user and a second user device associated with a second user. The first user device is configured to detect a request input by the first user to share media content being processed by the user device with the second user, generate an invite message including data configured to be utilized by the second user device to access the media content, and send the invite message to the second user device by way of a messaging service. The second user device is configured to receive the invite message from the first user device by way of the messaging service, determine that the invite message is associated with a media sharing service, and perform one or more operations to facilitate access to the media content by the second user. Corresponding methods, systems, and apparatus are also disclosed.

25 Claims, 12 Drawing Sheets

(56) References Cited

OTHER PUBLICATIONS

Wikipedia, Lifecasting (Video Stream), 9 pages, http://en.wikipedia.org/wiki/Lifecasting_(video_stream), as accessed on May 24, 2011.

Youtube, Seth Allen Basketball Highlights, 2 pages, http://www.youtube.com/watch?v=PsVKvZMrLmM, as accessed on Jun. 10, 2011.

* cited by examiner

SYSTEMS AND METHODS FOR SHARING MEDIA CONTENT BETWEEN USERS

BACKGROUND INFORMATION

As digital media, data communication, and electronic device technologies have advanced, the sharing of media content between users has become commonplace. As an example, a user of a mobile device such as a mobile phone may capture video footage of a scene and upload the video to a website (e.g., YouTube, Facebook, a blog, etc.) for access by users of web-enabled electronic devices. When a user accesses the uploaded video, the user is able to view a playback of the previously captured scene.

However, there remains room to improve upon conventional media sharing technologies. For example, conventional technologies for sharing media content between users are limited to specific types of electronic devices, communication networks, digital media formats, and/or configurations (e.g., point-to-point configurations). In some cases, certain electronic devices (e.g., certain set-top box and/or other in-home consumer electronic devices) that are well-equipped to access and play back media content are not equipped nor positioned to access and/or use conventional technologies to participate in sharing of media content such as user-generated live video, for example.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
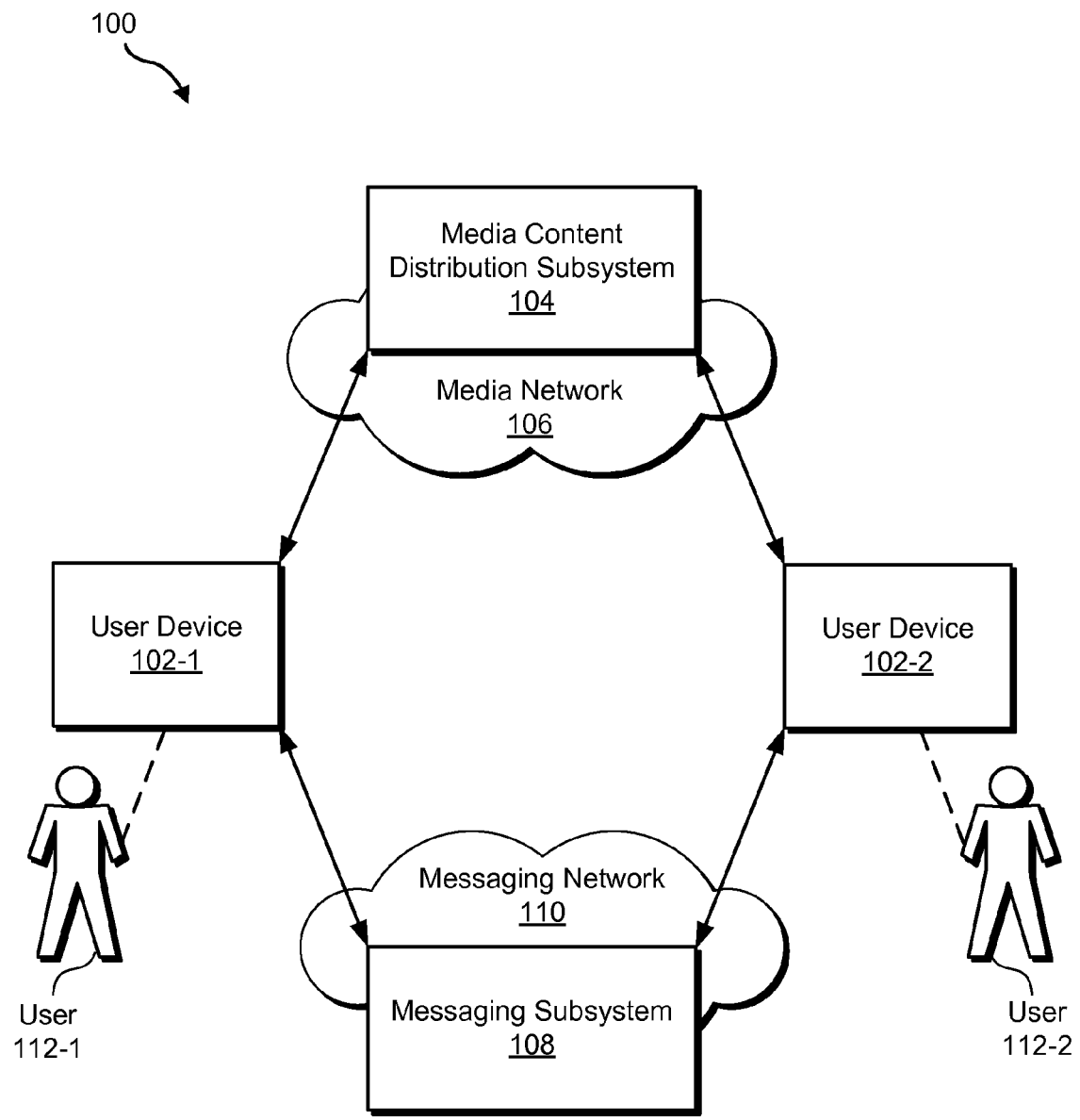
FIG. 1 illustrates an exemplary media sharing system according to principles described herein.

Exemplary systems and methods for sharing media content between users are disclosed herein. As described in detail herein, one or more user devices configured to process media content may implement a media sharing facility configured to provide and/or access a media sharing service to facilitate sharing of media content between users. For example, a media sharing facility implemented by a user device associated with a user may detect a request input by the user of the user device to share media content being processed by the user device with another user. In response, the media sharing facility may leverage a messaging facility implemented by the user device to generate an invite message configured to be sent by the user device to another user device associated with the other user. The invite message may include an indicator configured to be utilized by the other user device to determine that the invite message is associated with the media sharing service and data configured to be utilized by the other user device to access the media content.

The other user device associated with the other user may receive the invite message from the user device by way of the messaging service. A media sharing facility implemented by the other user device may determine, based on the indicator included in the invite message, that the invite message is associated with the media sharing service and, in response to this determination, perform one or more operations to facilitate access to the media content by the other user. As described herein, the one or more operations may facilitate access to the media content by any of a plurality of user devices associated with the user, including the user device that received the invite message by way of the messaging service and/or one or more other user devices that may have the invite message forwarded to them (e.g., by way of a local area network such as a wireless home network) by the user device that received the invite message by way of the messaging service, as described herein. In this manner, the reach of the media sharing service may be expanded beyond specific devices (e.g., devices configured to access a particular messaging service), communication networks, and/or configurations. This may provide the other user with flexibility in accessing and viewing shared media content using any of the user devices associated with the user, including, for example, mobile devices, in-home consumer electronics devices (e.g., a set-top box device, a television, a digital video recording ("DVR") device, etc.), personal computers, gaming devices, media processing devices not configured to send or receive messages by way of a particular messaging service, and any other suitable user devices.

These and/or other benefits provided by the disclosed exemplary systems and methods will be made apparent herein. Exemplary systems and methods for sharing media content between users will now be described in detail in reference to the drawings.

FIG. 1 illustrates an exemplary media sharing system 100 ("system 100"). As shown, system 100 may include user devices 102 (e.g., user devices 102-1 and 102-2) configured to communicate with a media content distribution subsystem 104 ("media subsystem 104") by way of a media network 106 and with a messaging subsystem 108 by way of a messaging network 110. As further shown, user devices 102 may be associated with (e.g., operated by) respective users 112 (e.g., users 112-1 and 112-2). The specific associations between users 112 and user devices 102 shown in FIG. 1 are illustrative only. Other associations may exist in other examples. For example, a particular user, such as user 112-2, may be associated with multiple user devices 102, as described in more detail below. Users 112 are typically end users of one or more services, such as a messaging service provided by messaging subsystem 108 and/or a media distribution and/or sharing service provided by media subsystem 104 that may be accessed by user devices 102.

User devices 102 may communicate with media subsystem 104 and messaging subsystem 108 using any suitable communication technologies. Examples of such communication technologies may include, without limitation, Transmission Control Protocol ("TCP"), Internet Protocol ("IP"), File Transfer Protocol ("FTP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Time Division Multiplexing ("TDM") technologies, Short Message Service ("SMS"), Multimedia Message Service ("MMS"), Enhanced Message Service ("EMS"), Evolution Data Optimized Protocol ("EVDO"), Long Term Evolution ("LTE") technologies, radio frequency ("RF") signaling technologies, Fiber-to-the-premises ("FTTP") technologies, Passive Optical Network ("PON") technologies, wireless and/or wire line data transmission technologies, other suitable communications technologies, or any combination or sub-combination thereof.

Media network 106 may include a single media network, separate media networks, or a combination of media networks suitable for carrying data representative of media content between media subsystem 104 and user devices 102. For example, media network 106 may include, without limitation, one or more wireless networks (e.g., satellite media broadcasting networks or terrestrial broadcasting networks), mobile telephone networks (e.g., cellular telephone networks), mobile data networks (e.g., 3G and/or 4G networks), subscriber television networks (e.g., broadcast, multicast, and/or narrowcast television networks), cable networks, hybrid fiber coax networks, optical fiber networks, broadband networks, narrowband networks, the Internet, wide area networks, and any other network or combination of networks capable of carrying media content between user devices 102 and media subsystem 104.

Messaging network 110 may include a single messaging network, separate messaging networks, or a combination of messaging networks suitable for carrying data representative of messages between user devices 102 and messaging subsystem 108. For example, messaging network 110 may include, without limitation, one or more mobile data networks (e.g., 3G and/or 4G networks), wide area networks, text messaging networks, email networks, instant messaging networks, social media networks, and any other network or combination of networks capable of carrying messages between user devices 102 and messaging subsystem 108.

In certain examples, media network 106 and messaging network 108 may comprise separate and independent networks. In other examples, media network 106 and messaging network 108 may include the same and/or overlapping networks.

Media subsystem 104 may include one or more computing devices (e.g., one or more server devices, subscriber television network devices, etc.) configured to provide one or more services related to media content for access by user devices 102. For example, media subsystem 104 may be configured to provide at least one of a television broadcasting, multicasting, and/or narrowcasting service, a video-on-demand service, a pay-per-view programming distribution service, and/or a user-generated content (e.g., live video) sharing service through which user devices 102 may access media content.

As part of one or more media services, media subsystem 104 may be configured to transmit data representative of media content to one or more user devices 102 by way of media network 106 in any suitable way. In certain embodiments, for example, media subsystem 104 may be configured to transmit one or more media content transport streams or feeds (e.g., MPEG-2 streams) containing data representative of one or more media content programs (e.g., one or more video programs to one or more user devices 102. For example, media subsystem 104 may be configured to transmit (e.g., broadcast or multicast) media content transport streams in accordance with a predefined programming or transmission schedule. For instance, one or more live television programs may be broadcast or multicast to user devices 102 by way of one or more media content carrier channels. As another example, media subsystem 104 may be configured to transmit (e.g., narrowcast) media content transport streams and/or feeds in response to one or more requests from one or more user devices 102. For instance, on-demand programs may be narrowcast to user devices 102 in response to requests for the on-demand programs. Media subsystem 104 may also be configured to provide information related to media content (e.g., metadata, program guide data, etc.) to user devices 102.

Figure 2:
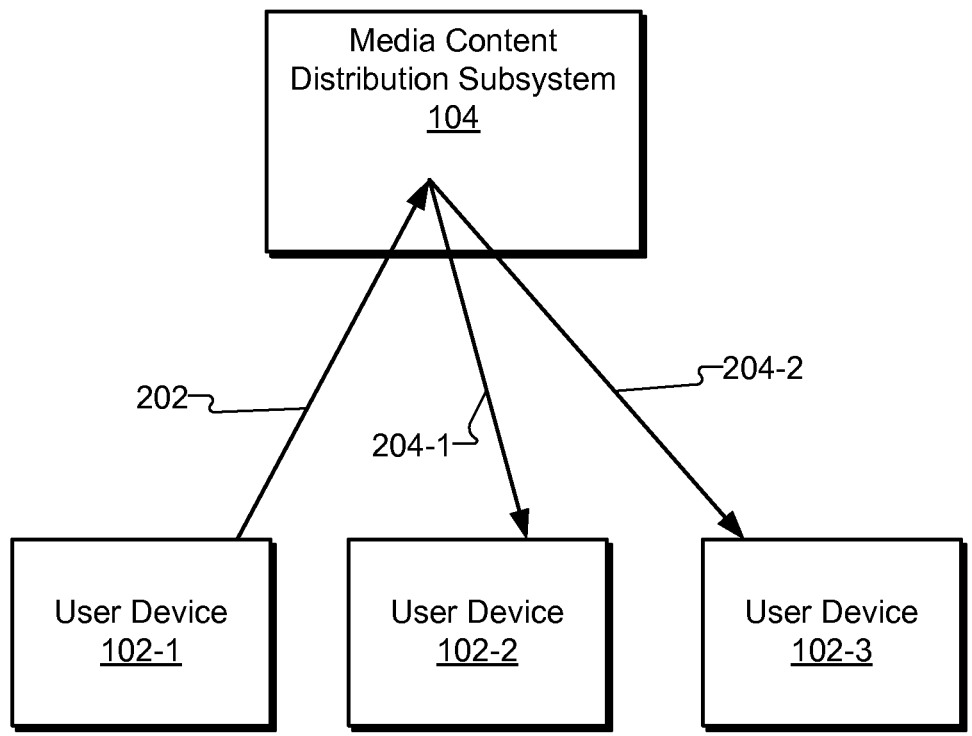
FIG. 2 illustrates a media content distribution subsystem receiving and distributing live video feeds from/to user devices according to principles described herein.

In certain examples, media subsystem 104 may provide a live video sharing service configured to facilitate sharing of user generated live video between user devices 102. As part of the live video sharing service, media subsystem 104 may be configured to establish one or more live video feed paths from a source user device 102 to one or more other user devices 102. For example, media subsystem 104 may include a point-to-multipoint server device configured to receive a live video feed from a source user device 102 and to establish one or more connections between the source live video feed and one or more distribution live video feeds that media subsystem 104 transmits to one or more other user devices 102. To illustrate, FIG. 2 shows media subsystem 104 receiving a source live video feed 202 from user device 102-1 and connecting the source live video feed 202 to both a distribution live video feed 204-1 from media subsystem 104 to user device 102-2 and another distribution live video feed 204-2 from media subsystem 104 to another user device 102-3. The combination of source video feed 202 and distribution video feed 204-1 forms a live video path from user device 102-1 to user device 102-2, and the combination of source video feed 202 and distribution video feed 204-2 forms another live video path from user device 102-1 to user device 102-3. In this or a similar manner, media subsystem 104 may establish multiple live video paths from a single source of a video feed to multiple destinations of the video feed, without the source of the video feed having to provide multiple outgoing video feeds to media subsystem 104.

Media subsystem 104 may be configured to facilitate sharing of media content, such as live video, between user devices 102 in real time. Accordingly, users may be able to concurrently experience media content shared in real time such that the users may share the experience with one another. As used herein, the term "real time" allows for delays produced by processing (e.g., transmission, transcoding, buffering, etc.) media content. Media subsystem 104 may be further configured to facilitate sharing of media content, such as live video, between user devices 102 in non-real time. As used herein, non-real time sharing of media content includes storing of media content such that the stored media content remains available for future non-real time distribution.

Media subsystem 104 may be configured to perform processing configured to facilitate reception and distribution of live video feeds in various formats suited for various capabilities of user devices 102. For example, media subsystem 104 may be configured to receive one or more source video feeds that include video content in one or more data formats, including, without limitation, Motion Picture Experts Group ("MPEG"), Windows Media Video ("WMV"), MP4, Advanced Audio Coding ("AAC"), Advanced Video Codec High Definition ("AVCHD"), Flash Video ("FLV"), Apple QuickTime Movie ("MOV"), RealVideo, Audio Video Interlaced ("AVI"), DivX, and any other suitable video data formats. Media subsystem 104 may be configured to transcode video content from certain formats to certain other formats, upscale and/or downscale video content (e.g., from one size or resolution to another size or resolution), modify video bit rates, or otherwise process video content. Media subsystem 104 may use such processing to generate and transmit one or more video feeds containing video content having properties that are well suited for processing by one or more particular user devices 102.

To illustrate, media subsystem 104 may receive a request from user device 102-2 to access live video included in source video feed 202 received by media subsystem 104 from user device 102-1. In response to the access request, media subsystem 104 may determine one or more attributes of user device 102-2 (e.g., attributes indicative of capabilities and/or resources of user device 102-2 related to receiving and/or processing video), determine from the device attributes one or more desired attributes of video to be sent to user device 102-2, process the live video included in video feed 202 to generate distribution live video feed 204-1 containing live video having the one or more desired video attributes, and transmitting distribution live video feed 204-1 to user device 102-2.

Additionally or alternatively, media subsystem 104 may perform processing of live video automatically without waiting to first receive an access request for the live video. For example, media subsystem 104 may receive source video feed 202 from user device 102-1 and process the live video included in source video feed 202 to generate one or more distribution video feeds 204. For instance, media subsystem 104 may generate multiple distribution video feeds 204 having properties that are well suited for processing by one or more particular user devices 102. In some examples, this may include generating "small," "medium," and "large" versions of the live video for distribution in distribution video feeds 204. A "large" version of the live video may be well suited for processing by a user device 102 having sufficient resources to process the "large" version of the live video (e.g., sufficient resources to process high definition and/or large size video content), a "medium" version of the live video may be well suited for processing by a user device 102 having sufficient resources to process the "medium" version but not the "large" version of the live video (e.g., sufficient resources to process standard definition and/or medium size video content), and a "small" version of the live video may be well suited for processing by a user device 102 (e.g., a mobile device) having sufficient resources to process the "small" version but not the "medium" version of the live video (e.g., sufficient resources to process a mobile device version and/or small size of video content).

In certain implementations, media subsystem 104 may be configured to perform processing of live video based on settings and/or historical data associated with the user (e.g., user 112-1) and/or the user device (e.g., user device 102-1) that publishes the live video to media subsystem 104. For example, media subsystem 104 may receive source video feed 202 from user device 102-1 associated with user 112-1, identify one or more other users 112 and/or user devices 102 associated with user 112-1 and/or user device 102-1 (e.g., users 112 and/or user devices 102 that have shared live video with user 112-1 and/or user device 102-1 in the past and/or that are part of a defined group of users that includes user 112-1), and process the live video received in source video feed 202 to prepare for distribution of the live video to one or more other user devices 102 if requested by the one or more other user devices 102. For instance, media subsystem 104 may transcode the live video received in source video feed 202 to a particular data format suited for processing by user device 102-2 such that if user device 102-2 requests access to the live video, the transcoded live video is ready for insertion into live video feed 204-1 for distribution to user device 102-2.

Media subsystem 104 may be configured to perform any of the above-described video processing at connections between a source video feed and one or more distribution video feeds. Accordingly, such video processing may be part of and/or may help form the connections between a source video feed and one or more distribution video feeds.

Media subsystem 104 may be configured to maintain and provide data configured to be used by user devices 102 to access media content from the media subsystem 104. The data may include any form and/or type of information that may be used by a user device 102 to access particular media content from media subsystem 104. For example, the data may include a unique identifier assigned to a media content program (e.g., a unique identified assigned to a live video) by media subsystem 104, an address (e.g., a Uniform Resource Locator, a file system address, a machine address, etc.) from which a media content program may be accessed, a source video feed identifier (e.g., an identifier of source vide feed 202), a broadcast, multicast, or narrowcast channel identifier (e.g., a media content carrier channel number associated with a frequency range within which a media content stream or feed is transmitted), a programming channel identifier (e.g., a television channel to which a user device 102 may tune in order to access media content associated with the television channel), and/or any other information that may be used by a user device 102 to access a particular media content program from media subsystem 104. Additionally, in some implementations, the information may include a key configured to be used by a user device 102 to unlock, decrypt, decode, or otherwise gain access to a locked, encrypted, or encoded media content stream or feed provided by media subsystem 104.

Media subsystem 104 may provide such data to user devices 102 for use by the user devices 102 to facilitate sharing of media content between users 112. To this end, a user device 102 may be configured to share the data with one or more other user devices 102 in conjunction with inviting the one or more other devices 102 to access shared media content. To illustrate, media subsystem 104 may assign a unique identifier to a live video included in source video feed 202 received from user device 102-1. Media subsystem 104 may provide data representative of the unique identifier to user device 102-1 for use by user device 102-1 to facilitate sharing of the live video with one or more other user devices 102-2 through 102-3. For example, user 112-1 may want to share the live video with user 112-2 and may input a share request into user device 102-1. In response to this share request from user 112-1, user device 102-1 may generate and send an invite message to user device 102-2 associated with user 112-2 by way of messaging subsystem 108. User device 102-1 may insert the unique identifier and other information about the live video and/or media subsystem 104 in the invite message, which may be actionable by user device 102-2. Accordingly, when user device 102-2 receives the invite message, user device 102-2 may utilize the unique identifier and other information included in the message to access the live video from media subsystem 104. For instance, user device 102-2 may send an access request including the unique identifier for the live video to media subsystem 104, which may use the identifier in the access request to identify the live video and generate and provide distribution live video feed 204-1 including the live video to user device 102-2.

With user device 102-2 in possession of the unique identifier for the live video and other information about the live video and/or media subsystem 104, user device 102-2 is equipped to facilitate further sharing of the live video by sharing the unique identifier and other information with one or more other user devices 102 in conjunction with inviting the one or more other users 112 to access the live video.

Figure 3:
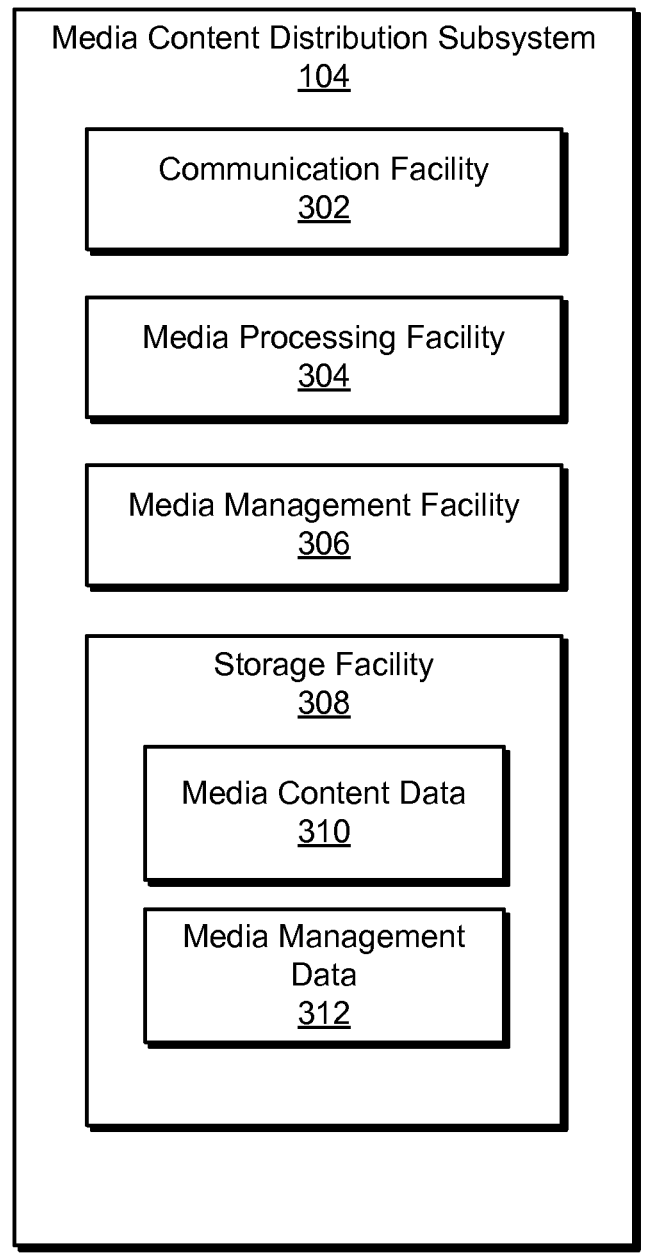
FIG. 3 illustrates exemplary components of a media content distribution subsystem according to principles described herein.

FIG. 3 illustrates exemplary components of media subsystem 104. As shown, media subsystem 104 may include a communication facility 302, a media processing facility 304, a media management facility 306, and a storage facility 308, which may be in communication with one another using any suitable communication technologies.

Communication facility 302 may be configured to facilitate communications between media subsystem 104 and user devices 102 using any communication technologies suitable to support the functionality of media subsystem 104 described herein, including any of the exemplary communication technologies described above that may be used for sending and receiving media content streams or feeds (e.g., video feeds) to/from user devices 102 by way of media network 106.

Media processing facility 304 may be configured to process media content, including by performing any of the exemplary media processing described herein on media content received from one or more media content providers and/or user devices 102 to prepare the media content for distribution to one or more user devices 102.

Media management facility 306 may be configured to generate and maintain data about media content received and/or distributed by media subsystem 104. For example, media management facility 306 may be configured to generate, assign, and/or otherwise manage unique identifiers and other information about media content (e.g., memory addresses, buffer information, and/or other information about locations of media content). In addition, media management facility 306 may be configured to generate and maintain information about media content streams or feeds being received and/or distributed by media subsystem 104, as well as information about connections between a source media content stream or feed (e.g., source video feed 202) and one or more distribution media content streams or feeds (e.g., distribution video feeds 204-1 and 204-2) and/or the video paths forms by the connections.

Storage facility 308 may be configured to maintain media content data 310 representative of media content. Media content data 310 may represent live media content being processed by media subsystem 104 and/or media content that is stored for subsequent, non-real-time access. Storage facility 308 may be further configured to maintain media management data 312 representative of information about media content. Media management data 312 may be maintained by media management facility 306 and may include any of the exemplary information described herein (e.g., media content access address information, index information, key information, etc.). Storage facility 308 may maintain additional or alternative data, including any of the data disclosed herein.

Messaging subsystem 108 may include one or more computing devices (e.g., one or more server devices, network devices, routers, switches, etc.) configured to provide one or more messaging services by which user devices 102 may send and receive messages to/from one another. For example, messaging subsystem 108 may be configured to provide at least one of a text messaging service, an email messaging service, an instant messaging ("IM") service, and/or a social media messaging service (e.g., a Facebook, Twitter, or other social media messaging service) by which user devices 102 may send and receive messages. Accordingly, messages received and sent from/to user devices 102 by messaging service 108 may include text messages, Short Message Service ("SMS") messages, Multimedia Message Service ("MMS") messages, Enhanced Message Service ("EMS") messages, email messages, instant messaging messages, social media messages (e.g., tweet messages), IP based messages (e.g., IP messages that use TCP/IP, HTTP, SIP, or other IP-based protocols), or other suitable type of messages.

As part of a messaging service, messaging subsystem 108 may be configured to receive messages from source user devices 102 and route and deliver the messages to target user devices 102. To this end, messaging subsystem 108 may maintain data that may be used to route incoming messages to appropriate target user devices 102. For example, messaging subsystem 108 may maintain, without limitation, data representative of users 112, user devices 102, user network status information (e.g., user network presence information), user device network addresses and/or locations, user device geographic locations, user device statuses, user device attributes, and relationships between users 112 and user devices 102. After receiving an incoming message from a source user device 102, messaging subsystem 108 may utilize such data maintained by messaging subsystem 108 to identify, route, and send the message to the appropriate target user device(s) 102.

Messaging subsystem 108 may be configured to forward a message to a particular user device 102 associated with a user 112, to a subset of user devices 102 associated with a user 112, or to all user devices 102 associated with a user 112. The particular user device 102 or user devices 102 associated with the user 112 may be indicated by settings maintained by messaging subsystem 108, information included in the invite message, and/or by any other information indicating that the user 112 is proximate to and/or using the user device(s) 102.

Figure 4:
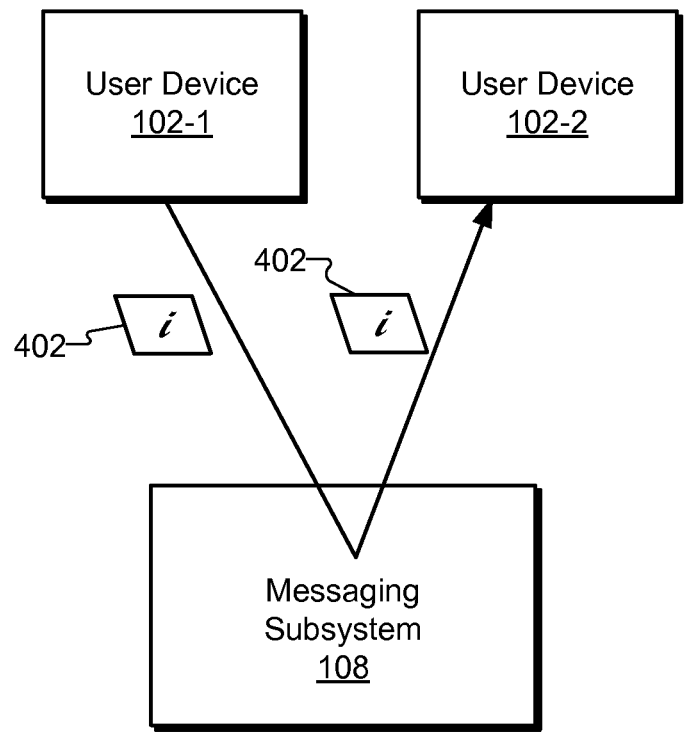
FIG. 4 illustrates a messaging subsystem receiving and forwarding an invite message from/to user devices according to principles described herein.

As described in more detail herein, user devices 102 may leverage messaging subsystem 108 and/or a messaging service provided by messaging subsystem 108 to facilitate sharing of media content between users 112. For example, invite messages may be generated by user devices 102 and sent between user devices 102 by way of messaging subsystem 108 to facilitate access to shared media content. FIG. 4 illustrates an exemplary path of an invite message 402 between user devices 102-1 and 102-2. In the illustrated example, user device 102-1 generates and sends invite message 402 to user device 102-2. The invite message 402 is transmitted from user device 102-1 to messaging subsystem 108, which forwards the invite message 402 to user device 102-2.

In certain examples, the path of an invite message between user devices 102 is separate and independent of the path of media content shared between the user devices 102. For example, the path of invite message 402 shown in FIG. 4 is through messaging subsystem 108 by way of messaging network 110, while the path of live video formed by the combination of source video feed 202 and distribution video feed 204-1 is through media subsystem 104 by way of media network 106.

An invite message, such as invite message 402, may include any type of message that is suitable for the functionality described herein, including any of the exemplary types of messages disclosed herein (e.g., a text message, an SMS message, an MMS message, an EMS message, an email message, an instant messaging message, a social media message (e.g., a Facebook invite message, a "tweet" message, etc.), an IP based message, etc.). In addition, the invite message may include data that makes the message actionable by a receiving user device 102 to facilitate user access to shared media content associated with the invite message.

For example, the invite message may include an indicator configured to be utilized by a receiving user device 102 to determine that the invite message is associated with a media sharing service. By making this determination, the user device 102 may distinguish the invite message from standard messages that may be received by way of a messaging service provided by messaging subsystem 108. In response to a determination by the user device 102 that the invite message is associated with the media sharing service, the user device 102 may perform one or more operations to facilitate user access to media content associated with the invite message. Examples of such operations are described in detail herein.

The indicator may comprise any data in any format within a message and that may be detected and utilized by a receiving user device 102 to determine that the message is associated with a media sharing service. For example, the indicator may comprise a predetermined data value specified by one or more bits of data (e.g., a specific alphanumeric sequence, a flag, etc.). The indicator may be included in any suitable field of a message.

In addition, the invite message may include data configured to be used by a receiving user device 102 to access media content associated with the message. Such data may include any of the information about media content and/or a source or distributor of media content disclosed herein, such as a media content program identifier, address information (e.g., a URL, a machine address, etc.), and/or any of the information that is configured to be used by the receiving user device 102 to access shared media content from media subsystem 104.

Using the data included in the invite message, the receiving user device 102 may access the media content. For example, the user device 102 may tune to a particular media programming channel to access the media content. As another example, the user device 102 may communicate with media subsystem 104 by way of media network 106 to request access the media content.

To illustrate, in certain implementations, an invite message may comprise a text message (e.g., an SMS message) including an indicator configured to be utilized by a receiving user device 102 to determine that the invite message is associated with a media sharing service and data configured to be used by the user device 102 to access media content associated with the message from media subsystem 104. In other implementations, an invite message may comprise another type of message, such as any of the types of messages disclosed herein, that includes a media sharing service indicator and data configured to be used by the user device 102 to access media content associated with the message from media subsystem 104.

Figure 5:
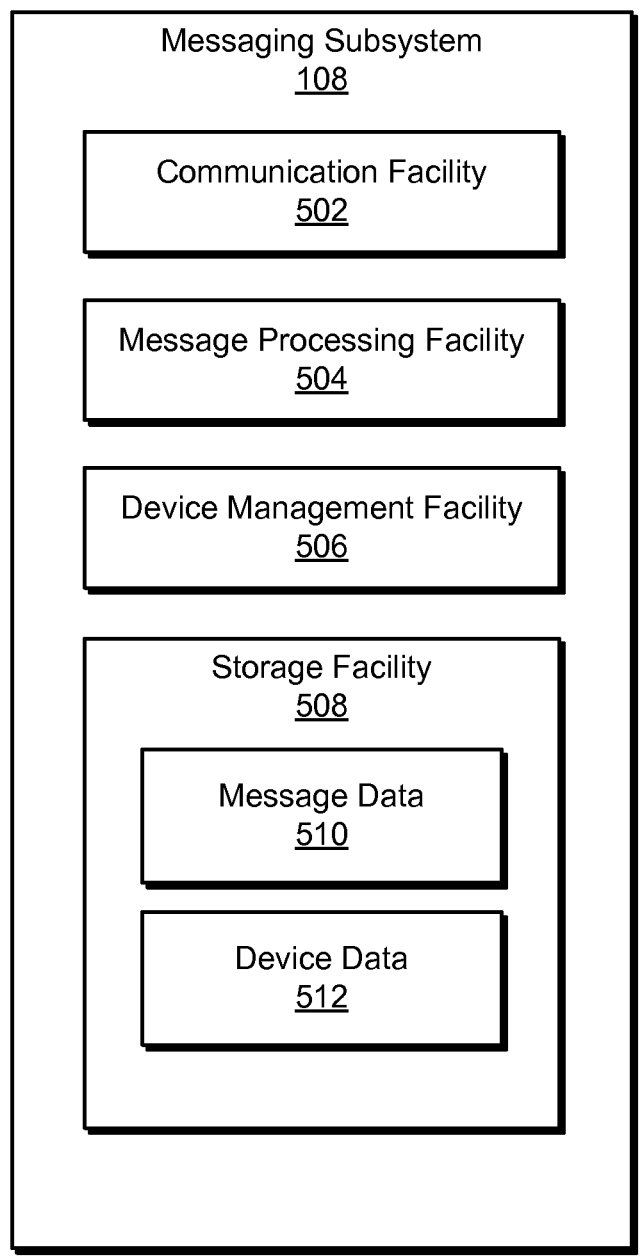
FIG. 5 illustrates exemplary components of a messaging subsystem according to principles described herein.

FIG. 5 illustrates exemplary components of messaging subsystem 108. As shown, messaging subsystem 108 may include a communication facility 502, a message processing facility 504, a device management facility 506 ("management facility 506"), and a storage facility 508, which may be in communication with one another using any suitable communication technologies.

Communication facility 502 may be configured to facilitate communications between messaging subsystem 108 and user devices 102 using any communication technologies suitable to support the functionality of messaging subsystem 108 described herein, such as any of the exemplary communication technologies disclosed above that may be used for receiving and sending invite messages from/to user devices 102 by way of messaging subsystem 108.

Message processing facility 504 may be configured to process invite messages, including by storing and/or forwarding invite messages to identified destinations. Device management facility 506 may be configured to maintain and/or access information about user devices 102 configured to send and/or receive messages to/from messaging subsystem 108. For example, device management facility 506 may maintain and/or access location information indicative of locations (e.g., physical locations such as GPS locations and/or network address locations) of user devices 102. To illustrate, in implementations in which messaging subsystem 104 provides a text messaging service by way of a wide area wireless data network, device management facility 506 may be configured to track locations of user devices 102 within the wide area wireless data network (e.g., track within which cells of the network user devices 102 are located) and maintain data representative of this information. Messaging subsystem 104 may then use this information to identify appropriate destinations (e.g., network cells, base stations, routers, etc.) to which received messages are to be forwarded in order to reach targeted user devices 102.

Additionally or alternatively, device management facility 506 may be configured to maintain data mapping users 112 to user devices 102. Device management facility 506 may use this data to determine to which user devices 102 to forward messages directed to particular users 112. In certain examples, device management facility 506 may be configured to maintain and/or access presence information indicative of the presence of a user 112 relative to one or more user devices 102 associated with the user 112 (e.g., which user device 102 the user 112 is currently using and/or nearby). The presence information may be obtained in any suitable way, such as by tracking activity of user devices 102 (e.g., user profile login and logout activities, receipt of messages from user devices 102, and any other activities of user devices 102 than may be tracked by messaging subsystem 108. Alternatively, device management facility 506 may access such presence information from a source and/or service external of messaging subsystem 108.

Storage facility 508 may be configured to maintain message data 510 representative of messages (e.g., invite messages) received and/or sent from/to user devices 102 by way of messaging subsystem 108. Storage facility 508 may be further configured to maintain device data 512 representative of information about user devices 102 configured to send and/or receive messages to/from messaging subsystem 108. Device data 512 may be maintained by device management facility 506 and may include any information descriptive of user devices 102 and/or associated users 112. Storage facility 508 may maintain additional or alternative data, including any of the data disclosed herein.

Messaging subsystem 108 may be separate and independent of media subsystem 104. Accordingly, invite messages sent between user devices 102 by way of messaging subsystem 108 are transported over messaging paths that are separate and independent of the paths over which media content is transported between user devices 102 and media subsystem 104. While messaging subsystem 108 and media subsystem 104 may be separate and independent of one another, a media sharing service that provides for sharing of media content between users 112 by way of media subsystem 104 may leverage a messaging service provided at least in part by messaging subsystem 104 to use messaging between user devices 102 to facilitate sharing of media content between user 112. For example, each user device 102 may be configured to leverage a messaging service provided by messaging subsystem 108 to facilitate sharing of media content with other user devices 102, such as by leveraging a messaging facility implemented by the user device 102 to generate and send actionable invite messages to other user devices 102, which can utilize the actionable invite messages to access shared media content, as described herein.

To illustrate, an exemplary user device 102 and components and functionality of the user device 102 will now be described. A user device 102 may include any computing and/or electronic device operated by an end user and configured to perform one or more of the messaging and/or media content sharing operations described herein. For example, a user device 102 may include a mobile device (e.g., a mobile phone and/or a tablet computer), a personal computer, an in-home consumer electronic device (e.g., a set-top box device, a television, a DVR device, a gaming device, etc.), and any other suitable device configured to perform user device functionality described herein.

Figure 6:
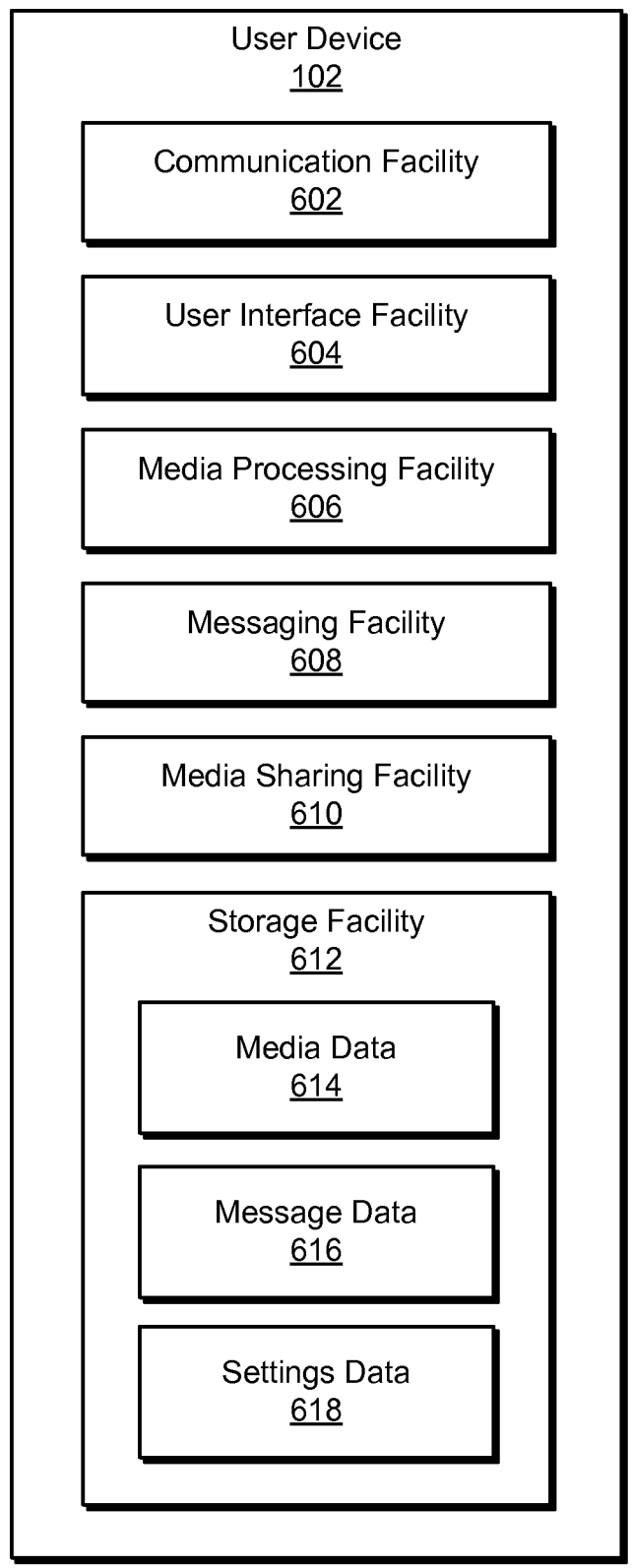
FIG. 6 illustrates exemplary components of a user device according to principles described herein.

FIG. 6 illustrates exemplary components of a user device 102. As shown, user device 102 may include a communication facility 602, a user interface facility 604, a media processing facility 606, a messaging facility 608, a media sharing facility 610, and a storage facility 612, which may be in communication with one another using any suitable communication technologies.

Storage facility 612 may be configured to maintain media data 614 representative of media content being processed by user device 102, message data 616 representative of messages generated, sent, and/or received by user device 102 by way of one of more messaging services, and settings data 618 representative of user profile settings, media sharing settings, and/or any other settings of user device 102. Storage facility 612 may maintain additional or alternative data, including any of the data disclosed herein.

Communication facility 602 may be configured to send and received communications and data to/from media subsystem 104 and messaging subsystem 108 using any suitable communication technologies, such as any of the exemplary communication technologies disclosed above.

User interface facility 604 may be configured to provide one or more user interfaces (e.g., graphical user interfaces ("GUIs"), display screens, audio speakers, touch screens, input mechanisms) through which a user 112 may interact with user device 102. Thus, through user interface facility 604, user device 102 may receive user input and provide user output, including any of the user input and/or output described herein.

Media processing facility 606 may be configured to process media content. For example, media processing facility 606 may receive media content from media subsystem 104 and process the received media content such as by buffering, storing, and/or providing the media content to user interface facility 604 for presentation to a user 112. As another example, media processing facility 606 may capture and process media content. For instance, media processing facility 606 may utilize a video camera implemented by user device 102 to capture live video of a scene. Media processing facility 606 may process the captured live video, such as by buffering the live video, storing the live video, providing a live video to user interface facility 604 for presentation to a user 112, and/or transmitting data representative of the live video to media subsystem 104, as described herein. As another example, media processing facility 606 may process media content by rendering video content to be provided to user interface facility 604 for presentation to a user 112. These examples of processing media content are illustrative only. Other processing of media content may be performed by media processing facility 606 in other embodiments.

Messaging facility 608 may be configured to generate and send messages to messaging subsystem 108 for delivery by messaging subsystem 108 to one or more other user devices 102. In addition, messaging facility 608 may be configured to receive messages from messaging subsystem 108 and to process the received messages, such as by providing data representative of and/or included in the messages to user interface facility 604 for presentation to a user 112.

In order to send and receive messages to/from messaging subsystem 108, messaging facility 608 may be configured to access a messaging service provided by messaging subsystem 108. The messaging service may include one or more of the exemplary types of messaging services described herein, and the messages sent and/or received by messaging facility 608 may include any of the exemplary types of messages described herein. For example, in certain embodiments, messaging facility 608 may include a text messaging client application implemented by user device 102 and configured to access a text messaging service provided by messaging subsystem 108 to send and receive text messages. One or more additional or alternative types of messaging services may be accessed by messaging facility 608 in other embodiments.

Media sharing facility 610 may be configured to provide functionality, user interface options, and/or one or more tools configured to facilitate sharing of media content by and/or with a user 112 associated with user device 102. For example, media sharing facility 610 may be configured to generate one or more GUIs configured to provide a user 112 with one or more functions, options, and/or tools configured to be used by the user 112 to share media content with one or more other users 112. In addition, media sharing facility 610 may be configured to generate one or more GUIs configured to be used by a user 112 of user device 102 to access media content that is shared with the user 112 by another user 112. Exemplary GUIs and interactions of a user 112 with media sharing facility 610, which interactions may be provided by way of one or more GUIs, are described herein.

Media sharing facility 610 may be configured to leverage messaging facility 608 to facilitate a user 112 of a user device 102 sharing media content being processed by the user device 102 with one or more other users 112. To illustrate, media processing facility 606 implemented by user device 102-1 may be processing media content in any of the ways described herein. A user 112-1 of user device 102-1 may access a GUI generated by media sharing facility 610 and input a request through the GUI to share the media content being processed by user device 102-01 with another user 112-2. Media sharing facility 610 may detect the request input by user 112-1 to share media content being processed by user device 102-1 with another user 112-2 and, in response to the share request, may leverage messaging facility 608 to generate an invite message configured to be sent by user device 102-1 to another user device 102-2 associated with the other user 112-2. Media sharing facility 610 may leverage messaging facility 608 to automatically generate the invite message in response to the share request without requiring additional input from the user 112-2.

The invite message may be generated to include data that makes the invite message actionable by the receiving user device 102-2. For example, as described herein, the invite message may be generated to include an indicator configured to be utilized by the receiving user device 102-2 to determine that the invite message is associated with a media sharing service and data configured to be utilized by the receiving user device 102-2 to access the shared media content. This data may include an identifier associated with the media content, an address (e.g., a URL, server address, etc.), a content carrier or programming channel (e.g., a channel within a television service channel lineup) or any other data that may be used to access media content from media subsystem 104. Media sharing facility 610 be configured to access the data to be included in the invite message from data stored locally at user device 102-1 (e.g., data associated with the processing of the media content by user device 102-1) and/or from media subsystem 104. For example, if the media content being processed by user device 102-1 comprises a television program broadcast by media subsystem 104 and received by user device 102-1, media sharing facility 610 may be configured to determine a television channel to which user device 102-1 is tuned to in order to access the television program and insert data representative of the television channel in the invite message.

Messaging facility 608 may send the generated invite message to user device 102-2 by way of a messaging service associated with (e.g., accessible by) messaging facility 608 and provided by messaging subsystem 108. In certain examples, media sharing facility 610 may be configured to instruct messaging facility 608 to automatically send the generated invite message to user device 102-2 by way of messaging subsystem 108, without requiring additional input from user 112-1. In other examples, media sharing facility 610 may leverage messaging facility 608 to automatically generate the invite message and then allow messaging facility 608 to provide user 112-1 with an opportunity to manually enter additional information into the invite message, such as by typing text into the body of the invite message, and to provide input that triggers messaging facility 608 sending the invite message to the other user device 102-2 by way of messaging subsystem 108.

Media sharing facility 610 may be configured to identify a user device (e.g., user device 102-2) and/or address associated with a user to which to send an invite message in any suitable way. As an example, media sharing facility 610 may be configured to leverage user contact information stored or otherwise accessible by user device 102-1 to identify a user device 102 and/or address associated with a user 112 with whom media content is to be shared. For instance, media sharing facility 610 may access an address book to identify a messaging address (e.g., a mobile phone number, an e-mail address, etc.) and/or other information that may be used to determine a user device to which the invite message will be sent. In certain implementations, for example, media sharing facility 610 may be configured to determine a mobile phone number associated with a user in an address book and send the invite message, which may comprise a text message, to the mobile phone number by way of messaging subsystem 108. Accordingly, a mobile phone user device associated with the user may receive the invite message by way of messaging subsystem 108.

In certain examples, media sharing facility 610 may be configured to select a type of messaging service to use and/or a type of message to generate based on information included for a user 112 in an address book. For example, if the address book does not include a mobile phone number but includes an email address for a user, media sharing facility 610 may elect to generate an invite message in the form of an email message.

As another example, media sharing facility 610 may be configured to use predefined settings associated with a media sharing service to identify a user device and/or address associated with a user. For instance, users of the media sharing service may define settings to indicate one or more user devices and/or addresses to which invite messages should be sent. Media sharing facility 610 may be configured to access these settings (e.g., locally at user device 102-1 or remotely from media subsystem 104) and use information included in the settings to determine one or more user devices and/or addresses to which to send an invite message intended for a particular user. To illustrate, user 112-2 may define media sharing settings to indicate that user 112-2 prefers to receive invite messages at a particular user device 102-2 (e.g., a mobile phone) and/or address (e.g., a mobile phone number). Media sharing facility 610 may access these predefined settings to determine the user device 102-2 and/or address to which to send an invite message intended for user 112-2.

As yet another example, media sharing facility 610 may be configured to access user presence information from media subsystem 104 or another source of user presence information and use the information to identify one or more user devices 102 that are being used by or are accessible to user 112-2. To this end, user 112-2 may have previously provided media subsystem 104 permission to access and/or generate presence information based on detectable activities (e.g., log in/log off activities, media content processing activities, messaging activities, etc.) of one or more user devices 102 associated with user 112-2. Accordingly, media sharing facility 610 may access and use the presence information to send an invite message to one or more user devices 102 associated with user 112-2. The presence information may include any information potentially indicative of one or more user devices 102 being used or accessible by a user 112.

Media sharing facility 610 may be further configured to leverage messaging facility 608 to facilitate access to shared media content. To illustrate, a user device 102 may receive an invite message from another user device 102 (e.g., user device 102-2 may received an invite message from user device 102-1 or user device 102-1 may received an invite message from user device 102-2) by way of a messaging service provided by messaging subsystem 108. Media sharing facility 610 may determine, based on an indicator included in the invite message, that the invite message is associated with a media sharing service that is associated with media sharing facility 610 (e.g., accessible by media sharing facility 610) and provided at least in part by media subsystem 104. This determination may be made any suitable way. For example, media sharing facility 610 may be configured to monitor messages received by or directed to messaging facility 608 to detect any invite messages that are associated with the media sharing service (e.g., for messages including an indicator indicative of such as association). Media sharing facility 610 may be configured to intercept and process identified invite messages that are associated with the media sharing service.

In response to a determination that an invite message is associated with the media sharing service, media sharing facility 610 may perform one or more operations to facilitate user access to the shared media content associated with the invite message. In certain examples, the operations performed by the user device 102 may facilitate access to the shared media content by the user device 102 (e.g., by the same user device 102 that received the invite message directly from the messaging service). To illustrate, media sharing facility 610 may generate and provide a notification of the invite message for presentation to a user 112 of the user device 102. The notification may include any information about the invite message, the shared media content associated with the invite message, and/or any actions to be performed by the user 112 to access the media content with the user device 102. For instance, the notification may indicate a user input command to be input by the user 112 to initiate accessing of the media content by the user device 102. The indication of the user input command may be presented in any form and may include any information as may suit a particular implementation. In response to the notification, the user 112 may input the indicated user input command into the user device 102 by way of user interface facilities 604 in any suitable way. Media sharing facility 610 may detect the input of the user input command by the user 112. In response to this detection, media sharing facility 610 may utilize data included in the invite message to access the media content associated with the invite message from media subsystem 104. In certain examples, this may include media sharing facility 610 instructing media processing facility 606 to tune to a particular media programming channel (e.g., a particular television programming channel) or instructing communication facility 602 to transmit a request to access the media content to a particular address, such as to a URL and/or other address specified by the invite message.

In certain examples, the operations performed by the user device 102 may facilitate access to the shared media content by one or more other user devices (e.g., by one or more user devices that did not receive the invite message directly from the messaging service) associated with a user 112. For example, the operations may include media sharing facility 610 forwarding the invite message from the user device 102 to one or more other user devices associated with the user 112, which forwarding may facilitate user access to the shared media content through one or more other user devices associated with the user 112. This may allow the user 112 to access the shared media content using a preferred device.

Figure 7:
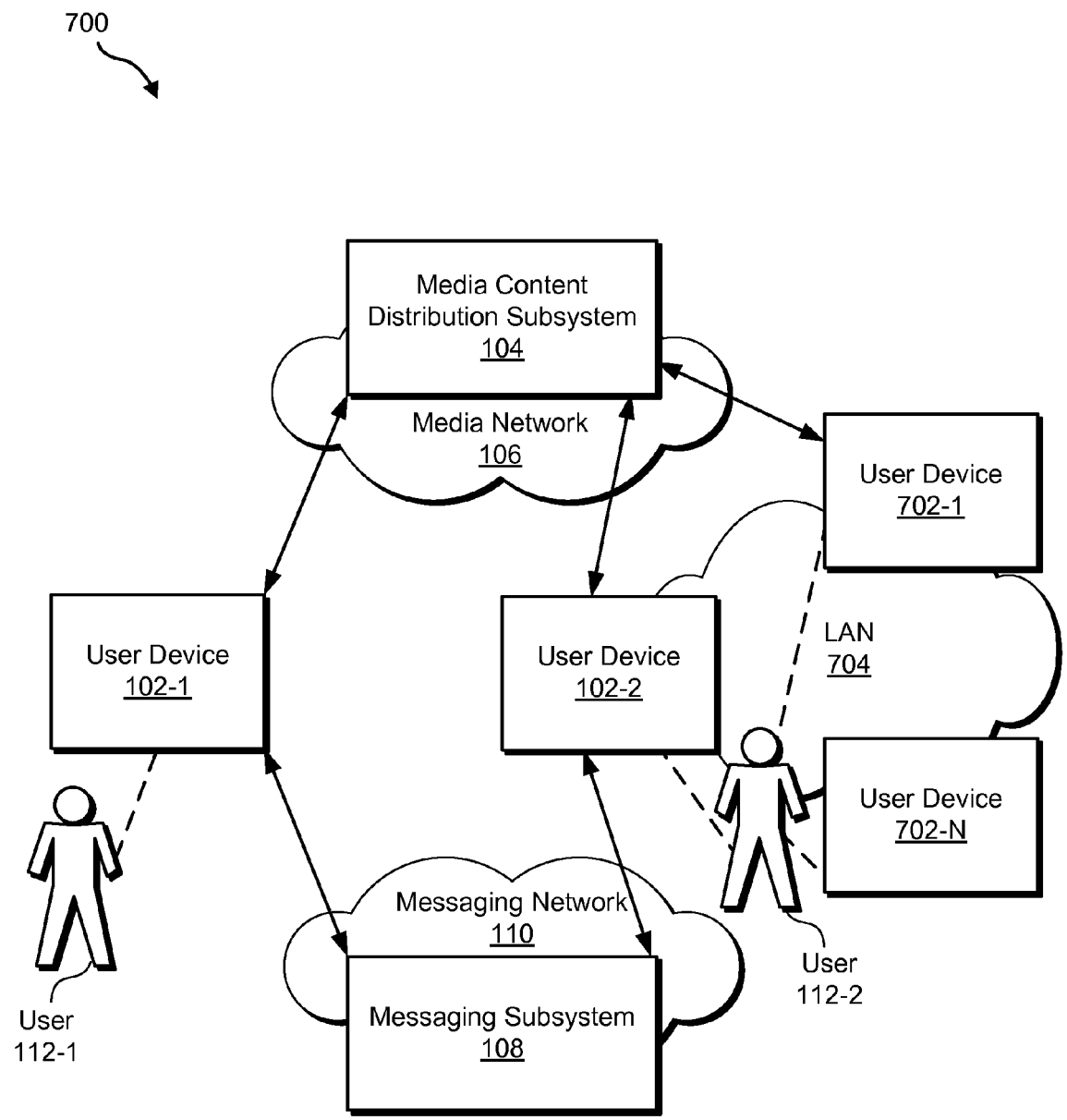
FIG. 7 illustrates another exemplary media sharing system according to principles described herein.

To illustrate, FIG. 7 shows an exemplary media sharing system 700 ("system 700"). System 700 is like system 100 except that in addition to user 112-2 being associated with user device 102-2, user 112-2 is also associated with other user devices 702 (e.g., user devices 702-1 through 702-N). In system 700, user device 102-2 may receive an invite message from user device 102-1 by way of a messaging service provided by messaging subsystem 108 and determine that the invite message is associated with a media sharing service as described above. In response to this determination, user device 102-2 may perform one or more operations, which may include forwarding the invite message to one or more other user devices 702 to facilitate user access to the media content by way of the other user device(s) 702. By forwarding the invite message as described herein, user device 102-2 may function as a gateway device for one or more other user devices 702 associated with user 112-2.

By user device 102-2 forwarding the invite message to one or more other user devices 702, the reach of the media sharing service provided by media subsystem 104 may be expanded to include one or more user devices 702 that may not otherwise be able to access the media sharing service and/or the messaging service described herein. For example, user devices 702 may not be configured to access the messaging service provided by messaging subsystem 108. Accordingly, user devices 702 may be unable to receive invite messages directly from the messaging service, which may limit the ability of user devices 702 to access or otherwise participate in the media sharing service provided by media subsystem 104.

To illustrate, in certain embodiments, the messaging service provided by messaging subsystem 108 may comprise a text messaging service, and user devices 102 may comprise devices (e.g., mobile phone devices) configured to access the text messaging service. Conversely, user devices 702 may comprise in-home consumer electronic devices (e.g., one or more set-top box devices) not configured to access the text messaging service or to receive invite messages directly from the text messaging service. In order to facilitate access to shared media content by user devices 702, media sharing facility 610 implemented by user device 102-2 may be configured to forward an invite message received from the text messaging service to one or more of the user devices 702. Each of the user devices 702 may implement media sharing facility 610 such that each user device 702 is configured to receive and use forwarded invite messages to access shared media content from media subsystem 104 in any of the ways described herein.

Media sharing facility 610 implemented by user device 102-2 may forward an invite message to one or more other user devices 702 in any suitable way and/or in any suitable format. To facilitate forwarding of invite message from user device 102-2 to user devices 702 associated with user 112-2, media sharing facility 610 may be implemented by user device 102-2 and each of user devices 702 and may be configured to facilitate communications between user device 102-2 and user devices 702, which communications may be used for forwarding invite messages from user device 102-2 to one or more of user devices 702. To this end, media sharing facility 610 may be configured to access data indicating all user devices 102-2 and 702 associated with user 112-2 that are configured to access the media sharing service provided by media subsystem 104. Such user device data may be included in settings associated with the media sharing service, which settings may be maintained by media sharing facility 610 implemented by user devices 102-2 and 702 and/or by components of media subsystem 104. The user device data may be maintained in any suitable way. For example, user 112-2 may configure his or her settings for the media sharing service, which configuration may include providing information to register user devices 102-2 and 702 with the media sharing service.

Because one or more of the user devices 702 may not be configured to receive invite messages from the messaging service provided by messaging subsystem 108, user device 102-2 may forward invite messages received through the messaging service to one or more of the user devices 702 using a different messaging format and/or communications protocol than that used by the messaging service. Accordingly, the forwarding of an invite message may include media sharing facility 610 of user device 102-2 using the invite message received from the messaging service to generate and transmit one or more other invite messages that contain data configured to be used by the media sharing facility 610 implemented by each of the other user devices 702 to access shared media content from media subsystem 104. Hence, user device 702-1 (e.g., a set-top box device, a mobile device, etc.) may receive a forwarded invite message from user device 102-2 and may utilize data included in the forwarded invite message to access shared media content from media subsystem 104, as described herein.

As shown in FIG. 7, in certain implementations, user devices 102-2 and 702 may be physically located within a footprint of a local area network ("LAN") 704 associated with user 112-2 (a home network such as a Wi-Fi network operated by user 112-2). Accordingly, user device 102-2 and user devices 702 associated with user 112-2 may be configured to communicate with one another by way of LAN 704, which communications may include transmission of an invite message from user device 102-2 to one or more of the other user devices 702 associated with user 112-2 by way of LAN 704. By user device 102-2 forwarding an invite message to one or more user devices 702 by way of LAN 704, user device 102-2 may function as a media sharing gateway device (e.g., an in-home media sharing gateway device). While FIG. 7 illustrates user device 102-2 and user devices 702 associated with user 112-2 as being located within the footprint of LAN 704, this is illustrative only. User devices associated with user 112-2 may be configured to communicate with one another by way of additional or alternative communication networks, including by way of a wide area network ("WAN").

In certain examples, media sharing facility 610 implemented by user device 102-2 may be configured to intelligently forward an invite message to one or more of user devices 702 in response to a detected satisfaction of one or more predefined criteria and/or an occurrence of one or more predefined events. In some embodiments, for instance, in response to detection of an invite message received from the messaging service provided by messaging subsystem 108, media sharing facility 610 of user device 102-2 may be configured to automatically forward the invite message to all of the other user devices 702 registered as being associated with the user 112-2. Accordingly, user 112-2 may be notified of the invite message regardless of the particular user device 702 the user 112-2 is using.

As another example, media sharing facility 610 implemented by user device 102-2 may be configured to provide a forwarding option to user 112-2 in response to a detection of an invite message received from the messaging service provided by messaging subsystem 108. For example, media sharing facility 610 may provide a notification of the invite message for presentation to user 112-2. The notification may indicate a user input command to be input by user 112-2 to forward the invite message to one or more other user devices 702 associated with user 112-2. The indication of the user input command may be presented in any form and may include any information as may suit a particular implementation. In response to the notification, user 112-2 may input the indicated user input command into user device 102-2 by way of user interface facility 604 in any suitable way. Media sharing facility 610 may detect the input of the user input command by user 112-2 and in response to this detection, forward the invite message to one or more user devices 702 associated with user 112-2.

In some examples, the notification may indicate a different user input command to be input to forward the invite message to each different user device 702 individually and/or a user input command to be input to forward the invite message to all of the other user devices 702 collectively. Accordingly, media sharing facility 601 may forward the invite message to a particular user device 702 individually or to all user devices 702 collectively depending on the user input command provided by user 112-2.

As another example, in response to a detection of an invite message received from the messaging service, media sharing facility 610 of user device 102-2 may determine whether user device 102-2 is located within the footprint of LAN 704. In response to a determination that user device 102-2 is located within the footprint of LAN 704, media sharing facility 610 may forward the invite message to one or more of the other user devices 702 associated with user 112-2 by way of LAN 704. Conversely, if user device 102-2 is determined not to be within the footprint of LAN 704, media sharing facility 610 may refrain from forwarding the invite message, forward the invite message by way of another path such as by way of a WAN, or save the invite message for future forwarding in response to an entry of user device 102-2 into the footprint of LAN 704.

As another example, in response to a detection of an invite message received from the messaging service, media sharing facility 610 of user device 102-2 may determine whether user devices 102-2 is compatible with the shared media content associated with the invite message. The determination may be made in any suitable way, including by analyzing the data included in the invite message (e.g., the data configured to be used to access the media content) or attempting to access and/or present the media content. In response to a determination the user device 102-2 is not compatible with the shared media content, media sharing facility 610 implemented by user device 102-2 may forward the invite message to one or more other user devices 702 associated with user 112-2. In certain implementations, media sharing facility 610 implemented by user device 102-2 may select one or more of the user devices 702 to receive the forwarded invite message based on the compatibility analysis performed by 102-2, which may be used by user device 102-2 to identify which of user devices 702 are compatible with the shared media content.

As yet another example, media sharing facility 610 implemented by user device 102-2 may be configured to forward an invite message to one or more other user devices 702 associated with user 112-2 in a targeted manner based on user presence information. The user presence information may include any information indicative of a user device, or multiple user devices, that are being used or are accessible by user 112-2. The presence information may include or be based on device log in/log off activities, media content processing activities, messaging activities, and/or other activities indicative of user interaction with user devices, as mentioned above. The presence information may be generated and maintained by media sharing facility 610, media subsystem 104, or a presence information service from which media sharing facility 610 may access the information.

To illustrate, in response to a detection of an invite message received from the messaging service provided by messaging subsystem 108, media sharing facility 610 implemented by user device 102-2 may access presence information for user 112-2, identify one or more user devices 702 based on the information as devices that are being used by or are accessible by user 112-2, and forward the invite message to the one or more identified user devices 702.

An example of sharing of media content in the form of user-generated live video between users will now be described in reference to the FIGS. 8-10. The sharing of the user-generated live video may be performed by one or more components of system 100 or system 700 in any of the ways described herein.

Figure 8:
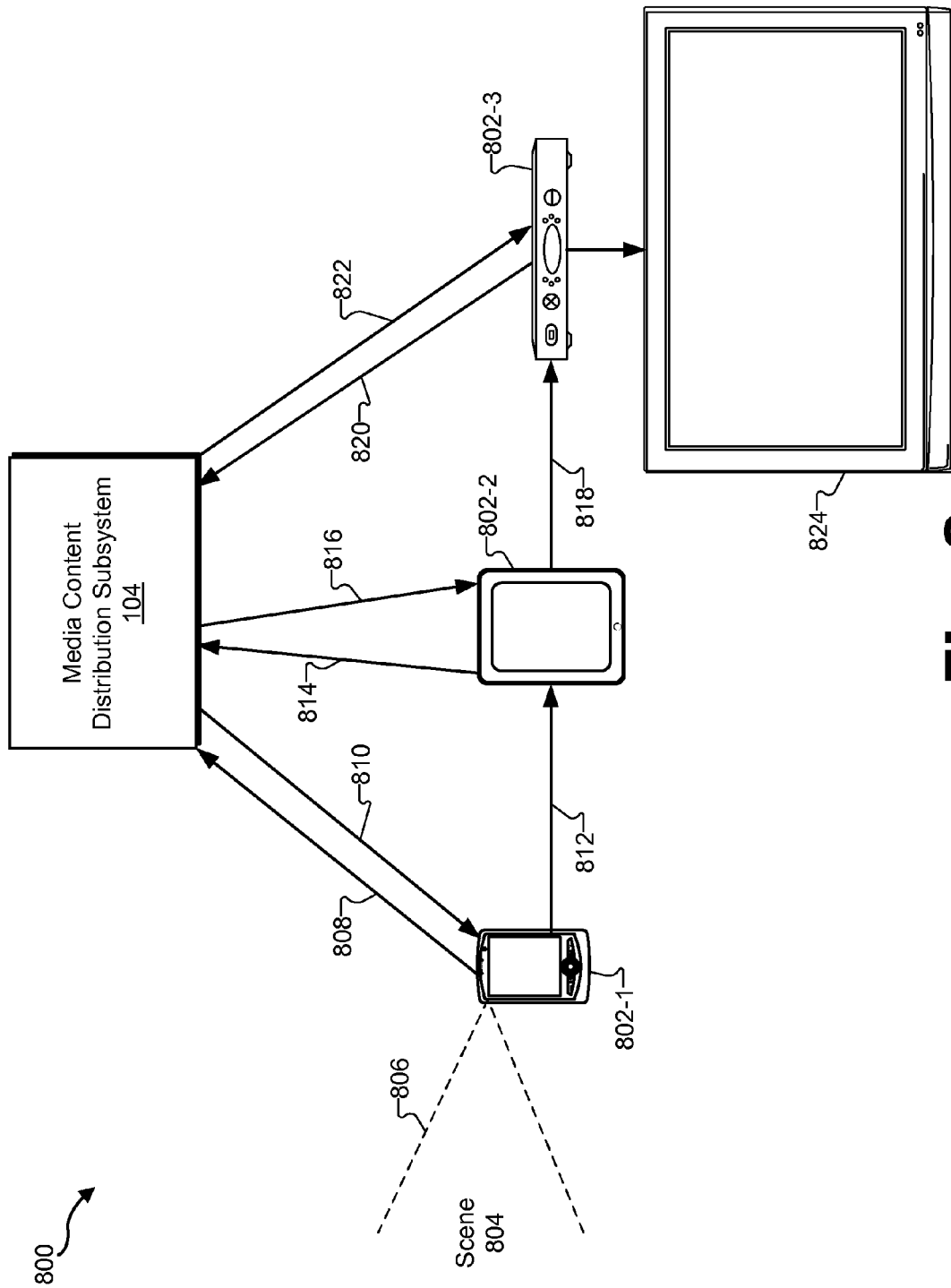
FIG. 8 illustrates an example of sharing of user-generated live video between user devices associated with users according to principles described herein.

FIG. 8 illustrates an exemplary media sharing flow 800 in relation to an example of sharing of user-generated live video between user devices 802 (e.g., user devices 802-1 through 802-3) associated with users. As shown in FIG. 8, a first user device 802-1 in the form of a mobile device equipped with a video camera may film a scene 804 that is within a video camera view 806. The captured video may be filmed in real time by a user associated with user device 802-1. Scene 804 may comprise of any event that may be filmed by user device 802-1. For example, a mother may utilize user device 802-1 to film a child's soccer game or other event.

In certain examples, user device 802-1 may capture audio associated with the video. This may allow the user of user device 802-1 to narrate the filmed event and to share the narration along with the live video.

User device 802-1 may publish the user-generated live video to media subsystem 104 in real time. Arrow 808 in FIG. 8 represents a video feed transmitted and carrying data representative of the captured live video from user device 802-1 to media subsystem 104. User device 802-1 may publish the user-generated live video to media subsystem 104 automatically in accordance with predefined settings or in response to any predefined event, such as in response to a user (e.g., the child's mother) providing a user input command to publish the live video. In certain examples, media subsystem 104 may be able to limit the distribution of the published live video to a group of one or more users included in a predefined user group (e.g., members of a family) in accordance with a user's media sharing settings, which may be defined in the user's user profile.

Media subsystem 104 may receive video feed 808 and perform processing on the live video included in video feed 808 in any of the ways described herein to prepare the live video for sharing with one or more other users. As part of the processing of the live video, media subsystem 104 may assign data to the live video, the data configured to be used by one or more user devices to access the live video from media subsystem 104. For example, media subsystem 104 may assign a unique identifier, a media channel (e.g., a personal television channel associated with the user of user device 802-1), and/or an access address (e.g., a URL) to the live video. Media subsystem 104 may provide the data assigned to the live video to user device 802-1 such that the user of user device 802-1 may utilize user device 802-1 to send the data to one or more other users to facilitate sharing of the live video with the other user(s). Arrow 810 in FIG. 8 represents transmission of this data from media subsystem 108 to user device 802-1.

The user of user device 802-1 may want to share the live video with another user (e.g., the child's grandfather). Accordingly, the user may provide input to user device 802-1 requesting that the live video be shared with the other user. The user of user device 802-1 may also provide input identifying the other user with whom the live video is to be shared. In response to the user input, user device 802-1 may generate and send an actionable invite message to user device 802-2, which is associated with the other user. This may be accomplished in any of the ways described herein. For example, user device 802-1 may generate and send an actionable invite message in the form of a text message (e.g., an SMS message) including data configured to be used to access the live video to user device 802-2 by way of a text messaging service provided by messaging subsystem 108. Arrow 812 in FIG. 8 represents transmission of the invite message from user device 802-1 to user device 802-2 by way of the messaging service.

User device 802-2, which may be a mobile device such as a tablet computer as illustrated in FIG. 8, may receive the invite message from the messaging service, determine that the invite message is associated with a media sharing service, and utilize data included in the invite message to access the live video from media subsystem 104, as described herein. For example, user device 802-2 may send a request to access the live video to media subsystem 104. The request may include data obtained from the invite message (e.g., a URL and/or unique identifier) and/or may be sent to an address indicated by the data obtained from the invite message. Arrow 814 in FIG. 8 represents transmission of the access request from user device 802-2 to media subsystem 104.

Media subsystem 104 may receive the access request from user device 802-2 and respond by transmitting a video feed containing data representative of the live video from media subsystem 104 to user device 802-2. Arrow 816 in FIG. 8 represents transmission of a video feed containing the live video from media subsystem 104 to user device 802-2. User device 802-2 may receive and process the video feed and present of the live video for experiencing by the user of user device 802-2.

The live video may be processed by media subsystem 104 in any of the ways described herein such that the live video included in the video feed is suitable for processing by user device 802-2. In some examples, media subsystem 104 may be configured to tailor the distributed live video to a particular user device. For example, media subsystem 104 may determine, from the access request received from user device 802-2, one or more attributes of user device 802-2 and/or a connection between media subsystem 104 and user device 802-2 and select, generate, and/or transmit a video feed containing live video that has one or more attributes well suited to the user device 802-2. For instance, media subsystem 104 may determine that user device 802-2 is a mobile device and generate or select a relatively low resolution and/or small size version of the live video for transmission to user device 802-2.

The user of user device 802-2 may want to share the live video with yet another user (e.g., the child's grandmother). Accordingly, the user may provide input to user device 802-2 requesting that the live video be shared with the other user. The user of user device 802-2 may also provide input identifying the other user with whom the live video is to be shared. In response to the user input, user device 802-2 may generate and send an actionable invite message to user device 802-3, which is associated with the other user. This may be accomplished in any of the ways described herein. For example, user device 802-2 may generate and send an actionable invite message in the form of a text message (e.g., an SMS message) including data configured to be used to access the live video to user device 802-3 by way of a text messaging service provided by messaging subsystem 108. Arrow 818 in FIG. 8 represents transmission of the invite message from user device 802-2 to user device 802-3 by way of the messaging service.

User device 802-3, which may be a set-top box device as illustrated in FIG. 8, may receive the invite message from the messaging service, determine that the invite message is associated with a media sharing service, and utilize data (e.g., a media programming channel identifier, URL, or other information) included in the invite message to access the live video from media subsystem 104, as described herein. For example, if the invite message includes data indicating a URL or other address, user device 802-3 may send an access request to the address to request access to the shared live video. The request may include data obtained from the invite message (e.g., a URL and/or unique identifier). Arrow 820 in FIG. 8 represents transmission of the access request from user device 802-3 to media subsystem 104.

Media subsystem 104 may receive the access request from user device 802-3 and respond by transmitting a video feed (e.g., an IP stream) containing data representative of the live video from media subsystem 104 to user device 802-3. Arrow 822 in FIG. 8 represents transmission of a video feed containing the live video from media subsystem 104 to user device 802-3. User device 802-3 may receive and process the video feed and present the live video for experiencing by the user of user device 802-3. For example, user device 802-3 may generate and provide a video signal to a display device such as a television 824, which may process the video signal and display the live video for viewing by the user of user device 802-3.

As described above, in some examples, media subsystem 104 may be configured to tailor the distributed live video to a particular user device. For example, media subsystem 104 may determine, from the access request received from user device 802-3, one or more attributes of user device 802-3 and/or a connection between media subsystem 104 and user device 802-3 and select, generate, and/or transmit a video feed containing live video that has one or more attributes well suited to the user device 802-3. For instance, media subsystem 104 may determine that user device 802-3 is a set-top box device and generate or select a relatively high resolution and/or large size version of the live video for transmission to user device 802-3 in view of a capability of the set-top box device to process high quality, large size video content.

In certain embodiments, media subsystem 104 and/or user device 802-3 may be configured to map a video feed (e.g., the video feed received from user device 802-1) to a media programming channel such that media subsystem 104 may broadcast, multicast, or narrowcast the live video on a media content carrier channel associated with the media programming channel and user device 802-3 may tune to the media programming channel to access the video feed, without having to send a specific access request to media subsystem 104. To this end, an invite message may include data indicating a media programming channel, and user device 802-3 may tune to the media programming channel (e.g., a personal television channel) to access a video feed transmitted by media subsystem 104 and that includes the live video.

Alternatively to user device 802-2 sending an actionable invite message in the form of a text message to user device 802-3 by way of a text messaging service in order to share the live video with a different user associated with user device 802-3, user devices 802-2 and 802-3 may be associated with the same user (e.g., the child's grandfather) and user device 802-2 may be configured to forward the invite message received from user device 802-1 to user device 802-3, as described above. For example, media sharing facility 610 implemented by user device 802-2 may forward the invite message to media sharing facility 610 implemented by user device 802-3 by way of a LAN when user devices 802-2 and 802-3 are located within the footprint of the LAN, as described above. Accordingly, the user associated with user devices 802-2 and 802-3 may choose which of the user devices 802-2 and 802-3 to use to access and view the shared live video. In this example, arrow 818 in FIG. 8 represents the forwarding of the invite message from user device 802-2 to user device 802-3 by way of communications different from the messaging service provided by messaging subsystem 108.

Figure 9:
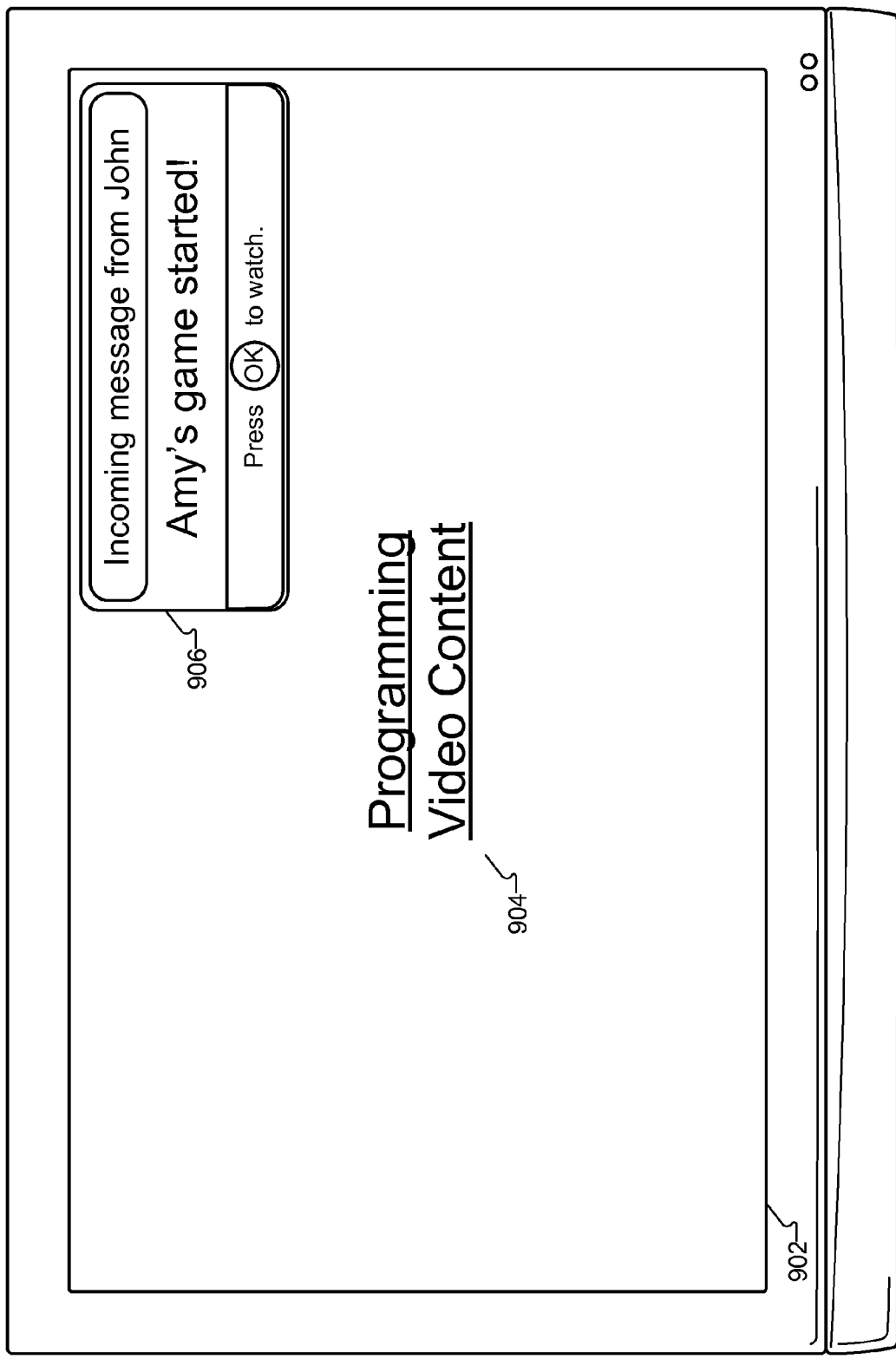
FIGS. 9-10 illustrate exemplary views presented on a display screen according to principles described herein.
Figure 10:
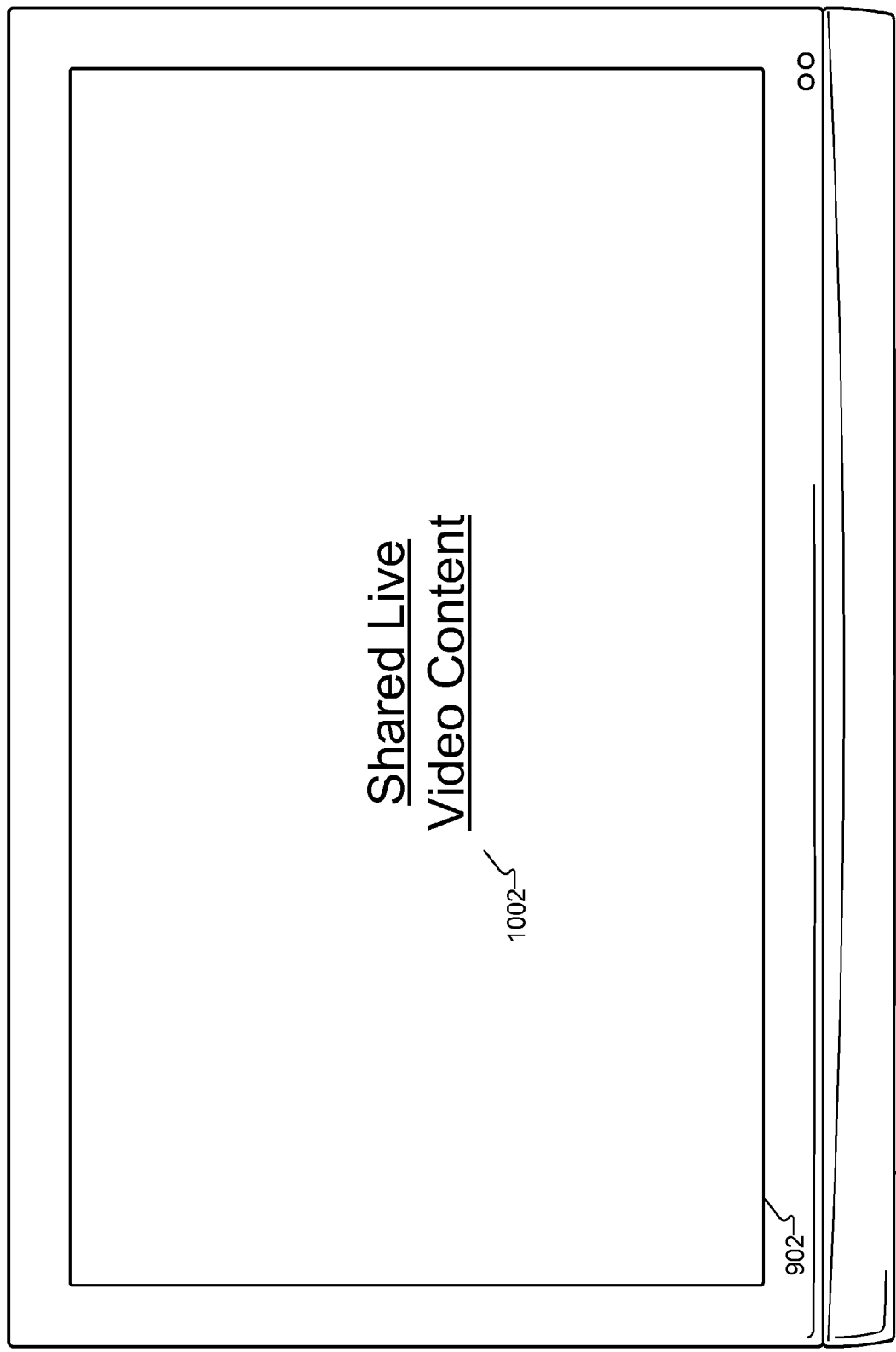

FIGS. 9-10 illustrate exemplary views presented on a display screen according to principles described herein. The views may be presented on a display screen 902 of television 824 or other display device in response to user device 802-3 determining that an invite message associated with a media sharing service has been received. As shown in FIG. 9, the view displayed on display screen 902 may include a full-screen display of programming video content 904 (e.g., a broadcast television program). In addition, the view may include a notification window 906 overlaid on a portion of programming video content 904. Window 906 may include text, graphics, and/or other information associated with the invite message received by user device 802-3. As shown, for example, window 906 may indicate a user from whom the incoming message is received and a user input command (e.g., an "OK" button) that may be input by a user to access the shared live video. Window 906 may also include a custom message provided by the sending user. In the illustrated example, the custom message indicates the child's game (e.g., Amy's soccer game) has started and is the content of the shared live video that will be presented if the user actuates the "OK" button. FIG. 10 illustrates display screen 902 displaying a full-screen view of the shared live video 1002 in response to the user selection of the "OK" button. While not shown in FIG. 9, in some examples, notification window 906 may visually indicate a media programming channel to which to tune in order to access the live video associated with the invite message. For example, the notification window 906 may include a message such as "Amy's game is on channel 555."

Figure 11:
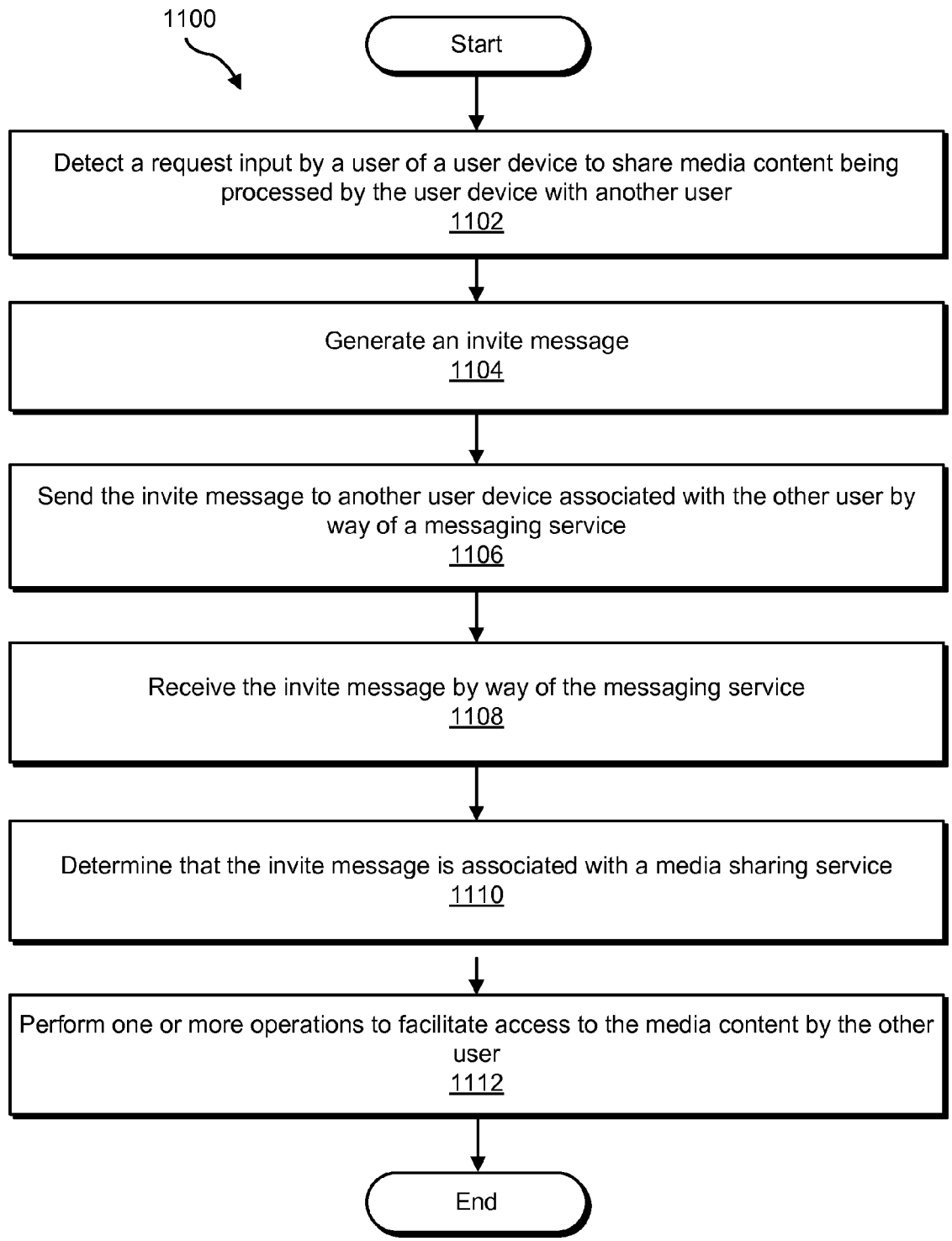
FIG. 11 illustrates an exemplary method of sharing media content between users according to principles described herein.

FIG. 11 illustrates an exemplary method 1100 of sharing media content between users according to principles described herein. While FIG. 11 illustrates exemplary steps according to one embodiment, other embodiments may omit, add to, combine, reorder, and/or modify one or more of the steps shown in FIG. 11. In certain examples, method 1100 may be performed by components of user devices such as user devices 102 and/or 802.

In step 1102, a user device detects a request input by a user of the user device to share media content being processed by the user device with another user. Step 1102 may be performed in any of the ways described herein.

In step 1104, the user device generates an invite message. Step 1104 may be performed in any of the ways described herein to generate an actionable invite message configured to be processed by another user device to facilitate access to the shared media content.

In step 1106, the user device sends the invite message to another user device associated with the other user by way of a messaging service. Step 1106 may be performed in any of the ways described herein.

In step 1108, the other user device receives the invite message from the user device by way of the messaging service. Step 1108 may be performed in any of the ways described herein.

In step 1110, the other user device determines that the invite message is associated with a media sharing service. Step 1110 may be performed in any of the ways described herein, including by the other user device detecting and using an indicator included in the invite message to determine that the invite message is associated with the media sharing service.

In step 1112, the other user device performs one or more operations to facilitate access to the media content by the other user. Step 1112 may include any of the exemplary operations described herein, including the other user device utilizing data included in the invite message to access the media content from media subsystem 104 or the other user device forwarding the invite message to one or more other user device is associated with the other user, as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 12:
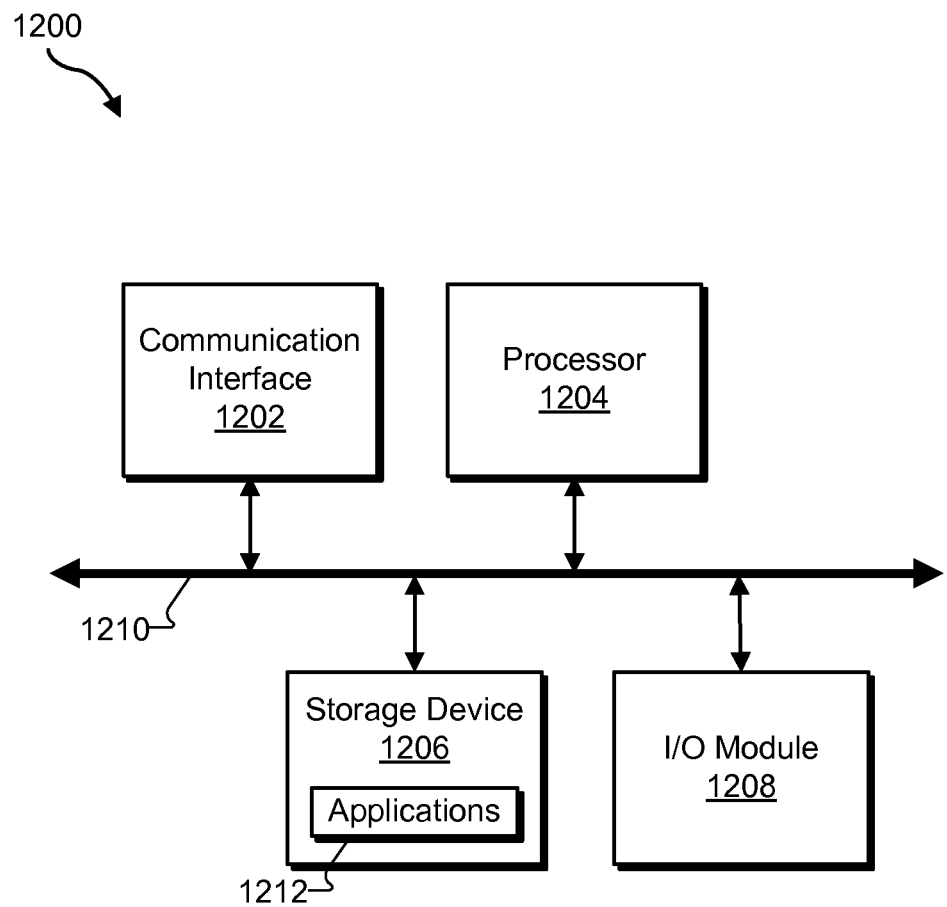
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1202 may be configured to interface with any suitable communication media, protocols, and formats.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another non-transitory computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with one or more of the facilities described herein. Likewise, one or more of the storage facilities described herein may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media sharing facility implemented by a first user device, a request input by a user of the first user device to share, in real time, end user generated live video being captured by the first user device with a second user device; and
   generating, by the media sharing facility implemented by the first user device in response to the share request, an invite message configured to be sent from the first user device to the second user device by way of a messaging service provided by a messaging subsystem, the invite message comprising an indicator configured to be utilized by a media sharing facility implemented by the second user device to determine that the invite message is configured to facilitate access to shared media content by way of a media sharing service and perform, in response to the determination that the invite message is configured to facilitate access to shared media content by way of the media sharing service, one or more operations to facilitate access, by an additional user device associated with a user of the second user device and not configured to access the messaging service, to the end user generated live video in real time from a media content distribution subsystem separate and independent of the messaging subsystem, and data configured to be utilized by the additional user device associated with the user of the second user device to access, in real time, the end user generated live video from the media content distribution subsystem.

2. The method of claim 1, further comprising sending, by a messaging facility implemented by the first user device, the invite message from the first user device to the second user device by way of the messaging service provided by the messaging subsystem.

3. The method of claim 2, further comprising:
receiving, by the second user device, the invite message from the first user device by way of the messaging service;
determining, by a media sharing facility implemented by the second user device based on the indicator included in the invite message, that the invite message is configured to facilitate access to shared media content by way of the media sharing service; and
performing, by the media sharing facility implemented by the second user device in response to the determining that the invite message is configured to facilitate access to shared media content by way of the media sharing service, the one or more operations to facilitate access, by the additional user device, to the end user generated live video in real time from the media content distribution subsystem.

4. The method of claim 3, further comprising:
utilizing, by the media sharing facility implemented by the second user device, data included in the invite message to access, in real time, the end user generated live video associated with the invite message from the media content distribution subsystem.

5. The method of claim 1, wherein the one or more operations comprise forwarding, by the media sharing facility implemented by the second user device, the invite message to the additional user device associated with the user of the second user device.

6. The method of claim 5, wherein the additional user device associated with the user of the second user device comprises at least one set-top box device.

7. The method of claim 5, wherein:
the second user device and the additional user device associated with the user of the second user device are configured to communicate with one another by way of a local area network; and
the invite message is forwarded to the additional user device by way of the local area network.

8. The method of claim 5, wherein the one or more operations further comprise:
providing, by the media sharing facility implemented by the second user device, a notification of the invite message for presentation by the second user device, the notification including a user input command to be input by the user of the second user device to forward the invite message to the additional user device associated with the user of the second user device; and
detecting, by the media sharing facility implemented by the second user device, a user input of the user input command to forward the invite message to the additional user device associated with the user of the second user device;
wherein the forwarding of the invite message to the additional user device associated with the user of the second user device is performed in response to the detected user input of the user input command.

9. The method of claim 5, wherein the one or more operations further comprise determining, by the media sharing facility implemented by the second user device, that the second user device is configured to communicate with the additional user device by way of a local area network;
wherein the forwarding of the invite message to the additional user device associated with the user of the second user device is performed in response to the determining that the second user device is configured to communicate with the additional user device by way of the local area network.

10. The method of claim 1, wherein:
the messaging service comprises a text messaging service; and
the invite message comprises a text message.

11. The method of claim 10, wherein the text message comprises one of a Short Message Service ("SMS") message, a Multimedia Message Service ("MMS") message, and an Enhanced Message Service ("EMS") message.

12. The method of claim 1, wherein the messaging service comprises one of an instant messaging service, an email messaging service, and a social media messaging service.

13. The method of claim 1, wherein the data included in the invite message and configured to be used to access, in real time, the end user generated live video comprises one of a Uniform Resource Locator ("URL") configured to be used to access, in real time, the end user generated live video from the media content distribution subsystem and an identifier of a television channel configured to be tuned to in order to access, in real time, the end user generated live video from the media content distribution subsystem.

14. The method of claim 1, embodied as computer-executable instructions on at least one non-transitory computer-readable medium.

15. A method comprising:
receiving, by a first user device associated with a first user, an invite message sent from a second user device associated with a second user by way of a messaging service provided by a messaging subsystem, the invite message comprising
an indicator configured to be utilized by the first user device to determine that the invite message is configured to facilitate access to shared media content by way of a media sharing service, and
data configured to be utilized by an additional user device associated with the first user to access, in real time, end user generated live video captured by a video camera implemented by the second user device from a media content distribution subsystem;
determining, by a media sharing facility implemented by the first user device based on the indicator included in the invite message, that the invite message is configured to facilitate access to shared media content by way of the media sharing service; and performing, by the media sharing facility implemented by the first user device in response to the determining that the invite message is configured to facilitate access to shared media content by way of the media sharing service, one or more operations to facilitate access, by the additional user device, in real time to the end user generated live video from the media content distribution subsystem, wherein the additional user device associated with the first user is not configured to access the messaging service.

16. The method of claim 15, wherein the one or more operations comprise:

providing, by the media sharing facility implemented by the first user device, a notification of the invite message for presentation to the first user of the first user device, the notification indicating a user input command to be input by the first user to initiate access, in real time, to the end user generated live video by the first user device;

detecting, by the media sharing facility implemented by the first user device, a user input of the user input command; and utilizing, by the media sharing facility implemented by the first user device in response to the detected user input of the user input command, data included in the invite message to access, in real time, the end user generated live video associated with the invite message from the media content distribution subsystem.

17. The method of claim 15, wherein the one or more operations comprise forwarding, by the media sharing facility implemented by the first user device, the invite message to the additional user device associated with the first user.

18. The method of claim 17, wherein the additional user device associated with the first user comprises at least one set-top box device not configured to access the messaging service.

19. The method of claim 17, wherein:

the first user device and the additional user device associated with the first user are configured to communicate with one another by way of a local area network; and the invite message is forwarded to the additional user device by way of the local area network.

20. The method of claim 17, wherein the forwarding of the invite message to the additional user device comprises:

generating, by the first user device, an additional invite message including the data configured to be utilized by the additional user device associated with the first user to access, in real time, the end user generated live video captured by the video camera implemented by the second user device from the media content distribution subsystem; and transmitting, by the first user device, the additional invite message to the additional user device.

21. The system of claim 17, wherein the forwarding of the invite message to the additional user device comprises forwarding the invite message to the additional user device by using at least one of a messaging format and a communications protocol that is different than a messaging format or a communications protocol used by the messaging service.

22. The method of claim 15, embodied as computer-executable instructions on at least one non-transitory computer-readable medium.

23. A method comprising:

capturing, by a first user device, live video of a scene;

transmitting, by the first user device, a source video feed including data representative of the live video to a media content distribution subsystem in real time;

receiving, by the first user device from the media content distribution subsystem, data configured to be used by a second user device to access the live video from the media content distribution subsystem;

receiving, by the first user device from a user of the first user device, a request to share the live video with a third user device;

generating, by the first user device in response to the share request, a text message configured to be used by the third user device to perform one or more operations to facilitate access, by the second user device, to the live video from the media content distribution system, the text message including the data configured to be used by the second user device to access the live video from the media content distribution subsystem; and sending, by the first user device by way of a text messaging service and in response to the share request, the text message from the first user device to the third user device, wherein the second user device is not configured to access the text messaging service.

24. A system comprising:

a first user device associated with a first user;

a second user device associated with a second user; and a third user device associated with the second user;

wherein the first user device detects a request input by the first user to share, in real time, end user generated live video being captured by the first user device with the second user, generates, in response to the share request, an invite message including an indicator configured to be utilized by the second user device to determine that the invite message is configured to facilitate access to shared media content by way of a media sharing service and data configured to be utilized by the third user device to access, in real time, the end user generated live video from a media content distribution subsystem, and sends the invite message to the second user device by way of a messaging service provided by a messaging subsystem;

wherein the second user device receives the invite message from the first user device by way of the messaging service, determines, based on the indicator included in the invite message, that the invite message is configured to facilitate access to shared media content by way of the media sharing service, and performs, in response to the determination that the invite message is configured to facilitate access to shared media content by way of the media sharing service, one or more operations to facilitate access, by the third user device, to the end user generated live video in real time from the media content distribution subsystem; and wherein the third user device is not configured to access the messaging service.

25. The system of claim 24, wherein:

the messaging service comprises a text messaging service; and the invite message comprises a text message.

* * * * *